(12) United States Patent
Shilpiekandula et al.

(10) Patent No.: US 9,170,580 B2
(45) Date of Patent: Oct. 27, 2015

(54) DETERMINING TRAJECTORIES OF REDUNDANT ACTUATORS JOINTLY TRACKING REFERENCE TRAJECTORY

(71) Applicant: Mitsubishi Electric Research Laboratories, Inc., Cambridge, MA (US)

(72) Inventors: Vijay Shilpiekandula, Boston, MA (US); Matthew Brand, Newton, MA (US); Manohar Srikanth, Cambridge, MA (US); Scott A. Bortoff, Brookline, MA (US)

(73) Assignee: Mitsubishi Electric Rsearch Laboratories, Inc., Cambridge, MA (US)

( * ) Notice: Subject to any disclaimer, the term of this patent is extended or adjusted under 35 U.S.C. 154(b) by 449 days.

(21) Appl. No.: 13/655,596

(22) Filed: Oct. 19, 2012

(65) Prior Publication Data

US 2014/0114463 A1      Apr. 24, 2014

(51) Int. Cl.
*G05B 11/01*      (2006.01)
*G05B 15/00*      (2006.01)
(Continued)

(52) U.S. Cl.
CPC ...... *G05B 19/19* (2013.01); *G05B 2219/25472* (2013.01); *G05B 2219/41194* (2013.01); *G05B 2219/41195* (2013.01); *G05B 2219/50218* (2013.01)

(58) Field of Classification Search
CPC ........ G05B 19/25; G05B 19/33; G05B 13/00; G05B 13/02; B23K 26/00; B23K 26/02; B23K 26/08; G06F 19/00; H04Q 1/00
USPC .......... 700/173, 10, 19, 33, 14, 169, 189, 61, 700/186, 275; 701/30; 710/5; 219/12; 318/41, 56, 57, 58; 340/82; 348/72; 356/39, 40, 62; 358/1, 3; 370/51
See application file for complete search history.

(56) References Cited

U.S. PATENT DOCUMENTS

| 5,220,262 | A  | 6/1993 | Kneifel, II et al. |
| 6,215,270 | B1 | 4/2001 | Nakamura et al. |
| 6,998,996 | B1 | 2/2006 | Eidson |
| 2007/0040527 | A1 | 2/2007 | Cardinale et al. |

(Continued)

FOREIGN PATENT DOCUMENTS

| DE | 19723956 A1 | 12/1998 |
| EP | 0515970 A1 | 12/1992 |

OTHER PUBLICATIONS

Ur-Rehman R et al. "Multi-objective path placement optimization of parallel kinematics machines based on energy consumption, shaking forces and maximum actuator torques: Application to the orthoglide," Mechanism and Machine Theory, Pergamon, Amsterdam, NL,. Vaol. 45, No. 8, Aug. 1, 2010.

*Primary Examiner* — Mohammad Ali
*Assistant Examiner* — Md Azad
(74) *Attorney, Agent, or Firm* — Dirk Brinkman; Gene Vinokur

(57) ABSTRACT

A method determines trajectories of redundant actuators of a machine including a first actuator and a second actuator. The method determines a first trajectory of the first actuator tracking a reference trajectory with an error tolerance, wherein the error tolerance is a function of a constraint of the second actuator, and determines a second trajectory of the second actuator based on a difference between the reference trajectory and the first trajectory.

13 Claims, 16 Drawing Sheets

(51) Int. Cl.
*G06F 19/00* (2011.01)
*G05B 13/02* (2006.01)
*G01N 33/48* (2006.01)
*G01N 33/08* (2006.01)
*G05B 19/25* (2006.01)
*G05B 19/33* (2006.01)
*G05B 13/00* (2006.01)
*G05B 19/19* (2006.01)

(56) References Cited

U.S. PATENT DOCUMENTS

| | | | |
|---|---|---|---|
| 2007/0278980 A1* | 12/2007 | Wilson | 318/573 |
| 2010/0085003 A1* | 4/2010 | Spring | 318/573 |
| 2012/0095599 A1* | 4/2012 | Pak et al. | 700/275 |
| 2013/0035773 A1* | 2/2013 | Wang et al. | 700/33 |

* cited by examiner

100

200

500

700

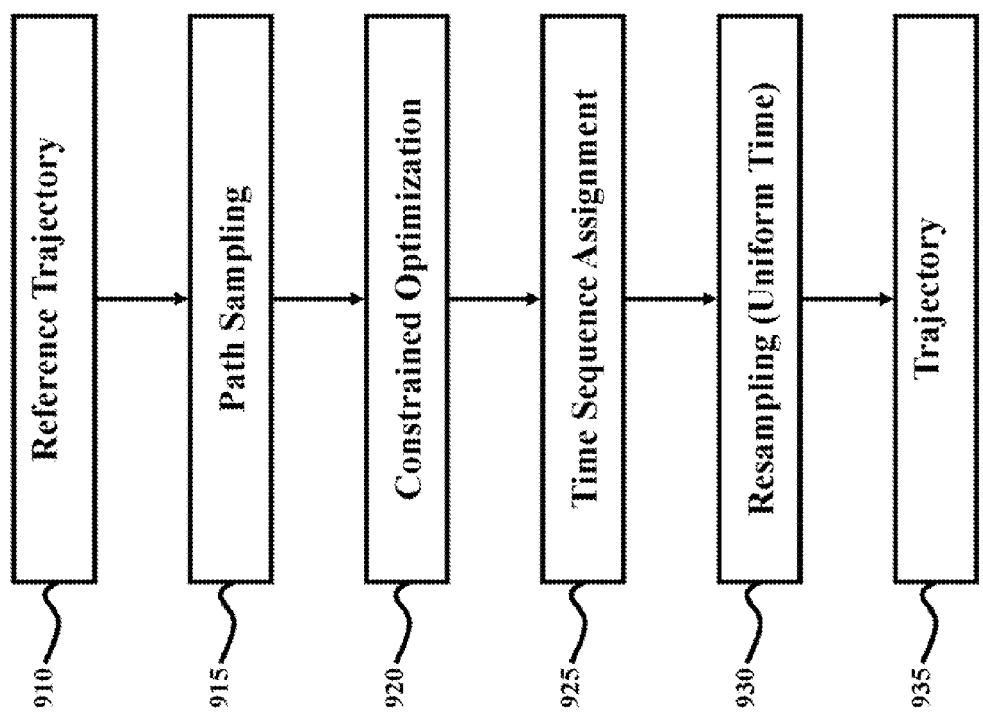

1000

DETERMINING TRAJECTORIES OF REDUNDANT ACTUATORS JOINTLY TRACKING REFERENCE TRAJECTORY

FIELD OF THE INVENTION

This invention relates generally to controlling an operation of a machine having redundant actuators, and more particularly to determining trajectories of the redundant actuators jointly tracking a reference trajectory.

BACKGROUND OF THE INVENTION

Common methods for operating laser cutting machines perform two-dimensional (2D) relative motion between a laser beam and a workpiece, such that the laser beam cuts the workpiece as the beam moves. In such machines, there are three options. A position of the laser is fixed and the workpiece is moved in X and Y directions. A position of the workpiece is fixed and the laser or a mirror in the beam path is moved in the X and the Y directions. The laser is fixed in the Y direction and the beam in the X direction, and the workpiece is fixed in X direction and moves in Y direction.

A limiting factor on the production rate of electromechanical machine, such as laser cutting machines, is directly related to the inertia of the components of the laser-cutting machine. Therefore, reduction of the effective inertia of the components has a direct impact on the productivity of the laser-cutting machine. Such reduction can be achieved by using redundant actuators along each direction of the motion.

For example, one laser cutting machine uses a pair of redundant actuators along the direction of the motion, i.e., a planar gantry with a high inertia and a polar gantry with a low inertia. However, the inertia of the laser even in this machine is still relatively large, as the laser-focusing lens itself is moved. Such motion also stresses the precision optics of the laser-focusing lens and may lead to a suboptimal cut.

Another possible method of reducing inertia, is to replace the XY motion completely with a pair of mirrors moved by galvano drives. With a suitable choice of lenses and lasers, these XY galvano scanheads can be used in the machine with redundant actuators as beam directors, or as laser engraving devices.

For example, one machine with redundant actuators places the XY galvano scanhead on the end of a multi-axial industrial robot arm. The path of the robot end is then constrained to stay within a "mobility tube" describing the set of positions where the galvano scanhead is capable of aiming at the area to be machined. The correct set of multi-axial robot joint motions, combined with the proper galvano drive signals are dynamically determined by the control unit.

However avoidance of "robot arm crashes" in this design, situations where the robot arm tries to pass through itself or through the workpiece, is computationally difficult, and requires not only an accurate model of the robot arm and scanhead, but also a continuously evolving model of the workpiece during different stages of the cutting process, because a forbidden motion at one stage in the cutting process may be available for another stage of the process. Accordingly, controlling the machine with redundant actuators is a challenging problem.

For example, in one method for controlling redundant actuators, i.e., a fast actuator and a slow actuator, the coordinated control of the redundant actuators is achieved by frequency separation. Because the slow actuator travels large ranges of motion at relatively low speeds when compared with the fast actuator, the slow actuator cannot follow the high frequency components of the reference trajectory. Accordingly, the reference trajectory is processed by low and high pass filters, such that the output of the low pass filter is submitted to the slow actuator and the output of the high pass filter is submitted to the fast actuator. However, that method does not explicitly handle the position constraints of the fast actuator. Too low a cut off frequency results in fast actuator position constraint violations. On the other hand, too high a cut-off frequency results in slow actuator carrying out most of the cutting motions, thus defeating the purpose of frequency separation method.

In another method for controlling redundant actuators in a laser cutting machine, a pseudo-inverse of a Jacobin matrix of the redundant configuration is used to compute joint profiles needed to position the fast actuator. That method only accounts for kinematics of the system while neglecting the dynamics of the actuators. Moreover, there are no guarantees that physical constraints of the actuators are satisfied, which can lead to the situations where the slow actuator moves beyond the range of the fast actuator and the error in tracking the reference trajectory becomes unbounded.

Furthermore, the method does not guarantee that the computed joint profiles execute the desired motion in minimal possible time duration. Ensuring minimum-time or time-optimal solutions is critical to improve on output rate or productivity of the laser cutting machine. Reducing the time of cutting to a least possible value can help in achieving valuable time savings, and also allows for optimizing on other bottlenecks in the production cycle.

Similarly, executing minimum-energy solutions can be desirable when a user operator would like to achieve low power consumption for the laser cutting machine. In practice, both minimum-time and minimum-energy solutions are hard to be simultaneously achieved. However, no existing method allows for exploiting inherent system dynamics to trade-off in a user-tunable manner between time of cutting and energy consumed.

Accordingly, there is a need to overcome the disadvantages described above.

SUMMARY OF THE INVENTION

It is an object of the various embodiments of the invention to provide a method for determining trajectories for the redundant actuators of a machine. It is further an object of the invention to jointly determine the trajectories of the actuators and a reference trajectory within a specified tolerance.

The operation of such redundant actuators is complicated by the fact that each point on the reference trajectory representing, e.g., a cutting path for a laser cutting machine, can be achieved by various, i.e., not unique, combinations of motions of the redundant actuators. This poses a problem of coordinated control for the redundant actuators, which also optimize operation of each actuator according to various metrics of performance. Examples of the metric of performance include optimal time or energy. However, such joint optimization problem is computationally difficult.

Some embodiments of the invention are based on realization that the problem of reference generation for machine with redundant actuators can be simplified as an optimization problem that first accounts only for spatial position constraints of the redundant actuators, irrespective of time response. In a subsequent step, a minimum-time solution can be assigned to synchronize motions of the individual actuators along the respective trajectories.

Specifically, in one embodiment of the invention, a constrained optimization is used to generate a smooth and short-length reference trajectory for one individual axis from the desired reference trajectory, while maintaining position constraints of the different actuators. These position constraints can be used as an error tolerance in a tracking application. In redundant systems, the position constraint can be a limit on the position range of one of the others, e.g., short-range motion, axes.

Such realization leads to dual decoupling of the parameters of optimization of the initial problem. First, some embodiments decouple spatial constraints from time constraints. Next, some embodiments decouple spatial constraints of redundant actuators. The second decoupling is based on a realization that a first trajectory of a first actuator can be determined based on tracking a reference trajectory with an error tolerance determined as a function of at least one constraint of the second actuator. Thus, the determination of the first trajectory can be reduced to tracking application independent from a second actuator and optimized using various techniques of the optimization.

For example, one embodiment determines a cost function representing an operation of the first actuator tracking the reference trajectory and optimizes, according to the metric of performance, the cost function subject to a constraint imposed by the error tolerance determined as a function of constraint of the second actuator. In one implementation of this embodiment, the cost function is determined to be quadratic. Solution of such quadratic cost function allows achieving global optimal solution to the trajectories of actuators over the entire reference trajectory.

The second trajectory can be determined based on a difference between the first trajectory and the reference trajectory. Next, a time sequence synchronizing an operation of the first actuator according to the first trajectory with an operation of the second actuator according to the second trajectory is determined. For example, synchronization can be determined based on synchronization of the points of trajectories such that constrains of the redundant actuators are satisfied.

In one embodiment of the invention, the optimization is formulated such that the length of the first trajectory (along with weighted $L_2$-norm of deviation) or the curvature and other higher spatial derivative terms of the first trajectory are minimized while satisfying the position constraints determined by the second actuator or its second trajectory. Once the trajectories of the redundant actuators are determined, a time sequence is assigned for tracking the path while maintaining motion constraints of the machine such as velocity, acceleration, torque limits.

In case of the redundant systems, the time sequence can be assigned by computing the shortest time step needed to coordinate motions along the desired reference trajectory and the smoothened reference trajectory of the individual actuators. This assignment can be performed in a time-optimal manner, thus generating the shortest takt times for a given path. In further improvements on the method, a slack variable can be introduced in the time steps for obtaining energy savings in tracking the path.

In one embodiment, the constrained optimization uses a quadratic, program, with a quadratic, cost and linear constraints. This results in a convex optimization problem, which guarantees a global optimal solution when a feasible solution exists. Furthermore, user-tunable weights on length, deviation error, curvature terms can be incorporated as constraint to trade-off path traversal length, tracking accuracy, and higher order spatial derivatives, such as curvature. Furthermore, through a coordinate transform on the problem, the quadratic program is shown to contain only box constraints, which makes the optimization amenable to computation times on the order of seconds, using fast quadratic programming (QP) solvers.

In yet another embodiment of the invention, one particular quadratic, program is a parallel quadratic programming solver that converts a quadratic program into a dual form that transforms the constraints to be in a positive cone. Parallel implementations offer the advantage of fast computation times, and linear in the number of processors used.

Furthermore, various embodiments of the invention provide a set of tuning parameters that can address each of the aspects of the cost function and the constraints. These embodiments can be used to simplify or preclude the need for explicit knowledge of operator(s).

Accordingly, one embodiment of the invention discloses a method for determining trajectories of redundant actuators of a machine, wherein the redundant actuators includes a first actuator and a second actuator. The method includes determining a first trajectory of the first actuator tracking a reference trajectory with an error tolerance, wherein the error tolerance is a function of a constraint of the second actuator; and determining a second trajectory of the second actuator based on a difference between the reference trajectory and the first trajectory. Steps of the method are performed by a processor.

Another embodiment discloses a method for controlling concurrently a first actuator and a second actuator of a machine. The method includes determining a first trajectory of the first actuator tracking a reference trajectory with an error tolerance as a function of an operational range of the second actuator, such that the first trajectory is optimized according to a metric, of performance; determining a second trajectory of the second actuator based on a difference between the first trajectory and the reference trajectory; determining a time sequence synchronizing an operation of the first actuator according to the first trajectory with an operation of the second actuator according to the second trajectory; and controlling concurrently the first actuator and the second actuator according to the first trajectory, the second trajectory, and the time sequence.

Yet another embodiment discloses a trajectory generator for determining trajectories of redundant actuators of a machine comprising a processor for executing a set of modules. The set of modules includes a path sampling module for sampling a reference trajectories to produce a set of points; a constrained optimization module for determining, based on the set of points, a first trajectory of a first actuator, such that the a curvature, and a length of the first trajectory is minimized without violation of an operational constraint of a second actuator, and for determining a second trajectory of the second actuator based on the first and the reference trajectories, wherein the operational constraint is satisfied when a shortest distance between a point on the first trajectory and the reference trajectory is greater than an operational range of the second actuator; and a time assignment module for assigning time stamps for points on the first and the second trajectories, such that motions along the first and the second trajectories are synchronized without violation of operational constraints of the redundant actuators.

BRIEF DESCRIPTION OF THE DRAWINGS

FIG. 9A is a diagram of a method for determining the trajectories according to some embodiments of the invention;

DETAILED DESCRIPTION OF THE PREFERRED EMBODIMENT

Figure 1:
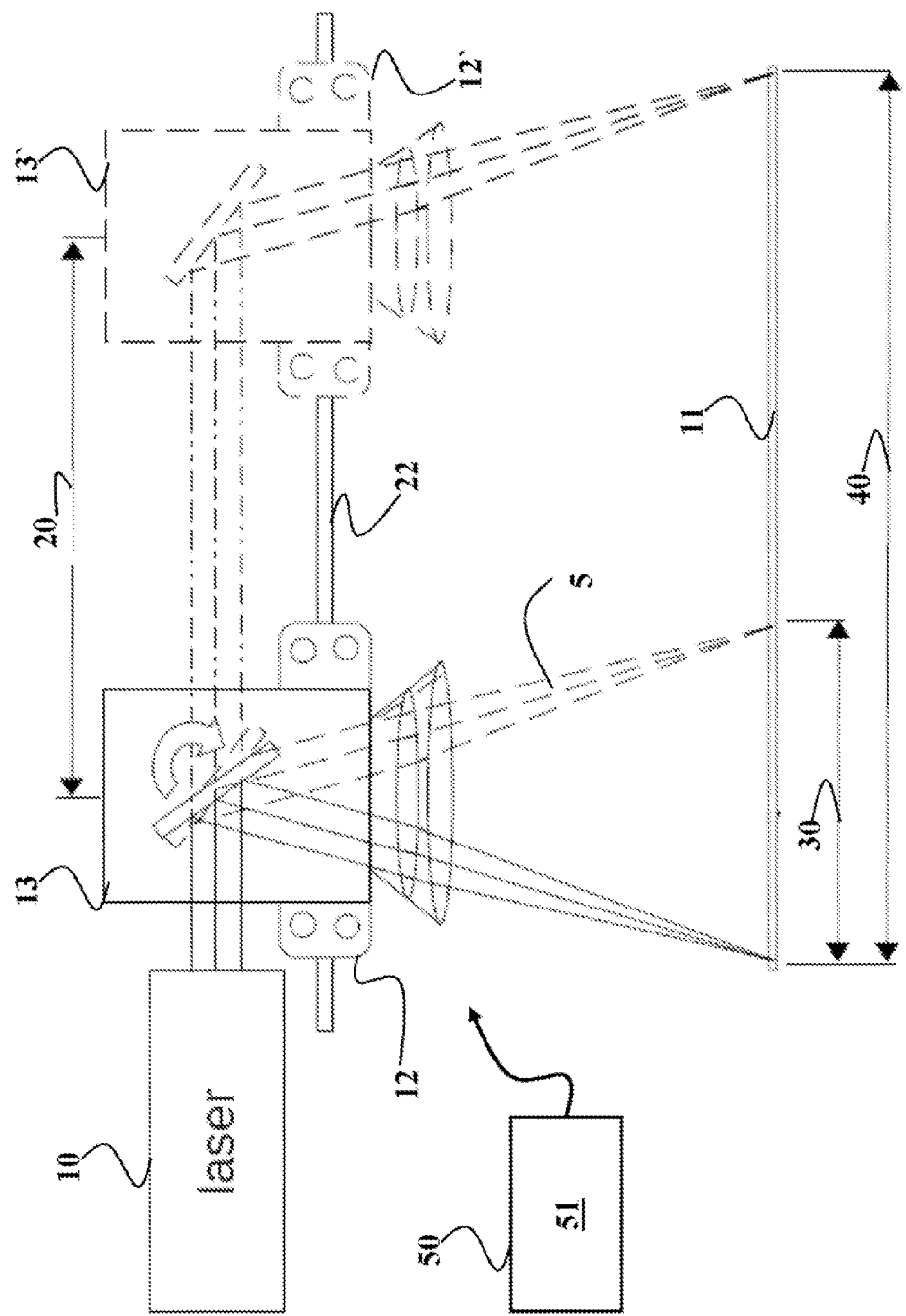
FIG. 1 is a block diagram of a laser cutting machine according to one embodiment of an invention.

FIG. 1 shows a block diagram of an exemplar machine having redundant actuators. The redundant actuators operate substantially concurrently for at least one direction of motion or operation. An example is a laser cutting machine 100. The laser cutting machine 100 is suitable for controlling a position of a beam produced by a laser 10 with respect to a workpiece 11. The laser cutting machine 100 includes redundant actuators, i.e., a first actuator and a second actuator, such that a laser beam travels along a first direction 20. However, the principles of the invention can be employed by any type of redundant actuators.

The laser cutting machine includes a first actuator, e.g., a platform 12 configured to move along at least the first direction 20. The platform is moved by a motion system 22 for moving the platform in a plane parallel to the workpiece. In one embodiment, the motion system 22 includes a first prismatic joint facilitating a first motion of the platform along the first direction 20.

The laser cutting machine also includes a second actuator, e.g., a galvano actuator or a scanhead 13 arranged on the platform 12, such that the motion of the platform along the first direction 20 causes a motion of the galvano assembly along the first direction. The platform actuator is a slow actuator having high inertia. The galvano actuator is a fast actuator having low inertia. The platform and the galvano scanhead operate for the same direction, and thus form the redundant actuators.

For example, the motion of the platform to a position 12' moves the galvano scanhead to a position 13'. Also, an operation of the galvano scanhead directs the laser beam to the workpiece along at least a second direction 30. The galvano assembly is arranged on the platform such that the second direction 30 is fixed with respect to the first direction 20, which allows directing the laser beam concurrently along the first direction and along the second direction. In various embodiments, the position of the laser beam on the workpiece is a vector sum 40 of the first motion, and the second motion. The motion of the platform and the operation of the galvano assembly are controlled by a control module 50. The control module 50 can be implemented using a processor 51.

Such arrangement of the galvano assembly on the platform precludes mechanical crashes of the galvano assembly with the platform during the operation of the laser cutting machine and enables simplification of the controlling operation of the laser cutting machine. Moreover, such arrangement enables summing the motions of the galvano assembly and the platform to reduce the time required for the laser cutting.

Other variations of the design of the laser cutting machine of FIG. 1 are possible and within the scope of the invention. For example, in some embodiment, the platform is configured to move in two directions and the motion system 22 includes a first prismatic joint facilitating a first motion of the platform along a first direction and a second prismatic joint facilitating a second motion of the platform along a second direction. Similarly, the galvano assembly may include a first mirror, wherein a third motion of the first mirror positions the laser beam along a third direction, and a second mirror, wherein a fourth motion of the second mirror positions the laser beam along a fourth direction. In such embodiments, the control module 50 controls concurrently the motion system and the galvano assembly, such that the position of the laser beam on the workpiece is a vector sum of the first motion, the second motion, the third motion, and the fourth motion.

Figure 2:
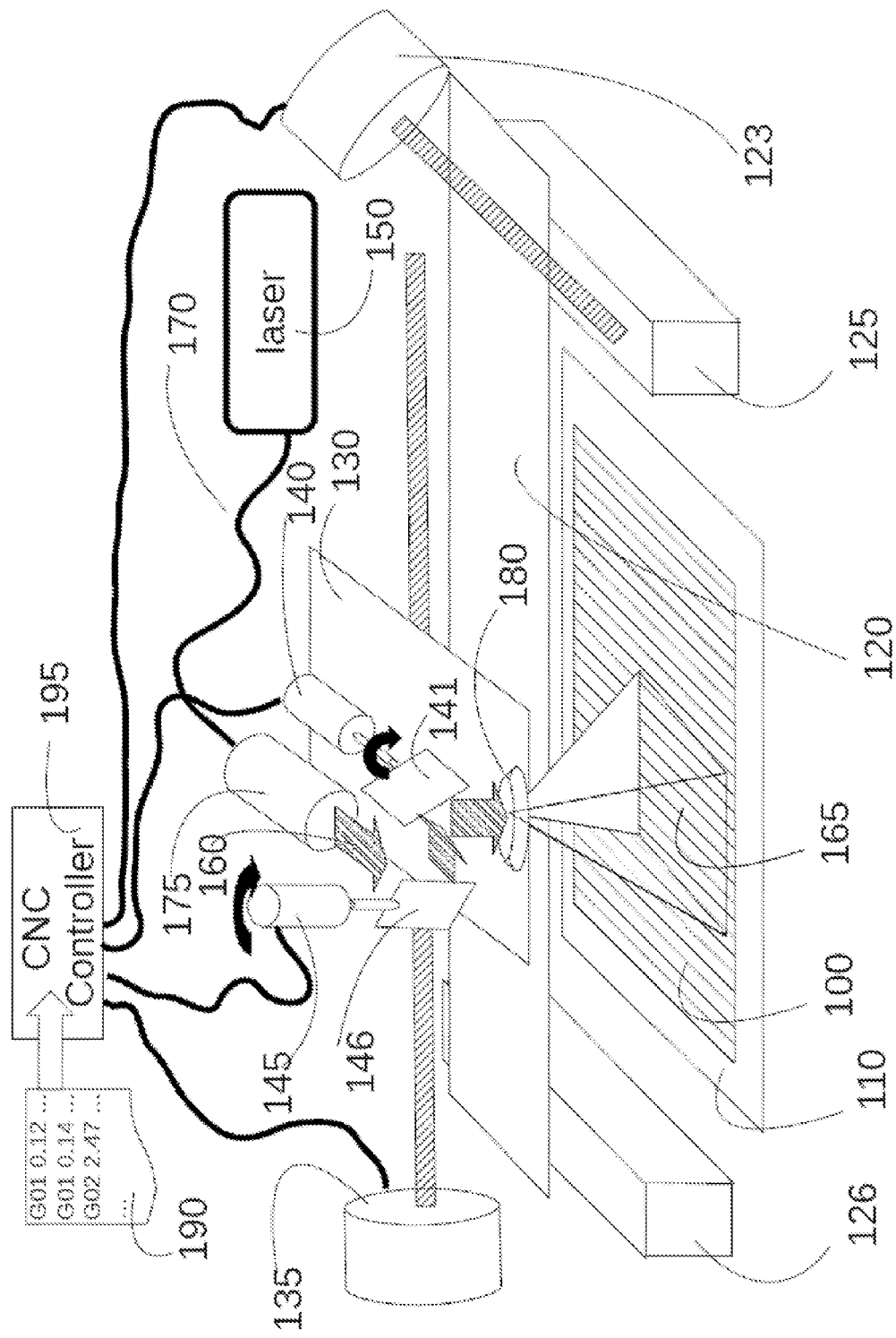
FIG. 2 is an isometric view of a laser cutting machine according to one embodiment of an mention.

FIG. 2 shows an isometric view of a laser cutting machine 200 according to one embodiment of an invention. The laser cutting machine 200 is shown for illustration purpose and is not intended to limit the scope of the invention.

A workpiece 100 is supported on a beam dump 110 beneath a gantry 120. The gantry moves on rails 125 and 126 along a first direction, e.g., along a Y-axis. The gentry 120 is moved along the first direction by a first servo motor and a first screw 123. A platform 130 is arranged on the gentry 120 and moves with the gentry along the first direction. Also, the platform 130 is moved along a second direction, e.g., along an X-axis, by a second servo motor and a second screw 135. In this embodiment, the gentry 120, the first servo motor and the first screw 123, and the second servo motor and the first screw 135 form a motion system for moving the platform in a plane parallel to the workpiece along the first and the second direction. However, other embodiments of the invention use different types of the prismatic joints to move the platform. For example, the first prismatic joint can include a first direction linear drive motor, and the second prismatic joint can include a second direction linear drive motor.

The galvano assembly, e.g., a two-axis galvano scan head having two orthogonal galvano drives, i.e., a first drive 140 and a second drive 145, a first mirror 141 and a second mirror 146, is arranged on the platform 130. A third motion of the first mirror 141 caused by the first driver 140 positions the laser beam along a third direction, and a fourth motion of the second mirror 146 caused by the second driver 145 positions the laser beam along a fourth direction.

In various embodiments, the galvano assembly is arranged on the platform such that the third direction is fixed with respect to the first direction, and the fourth direction is fixed with respect to the second direction. For example, in one embodiment, the first direction coincides with die third direction, and the second direction coincides with the fourth direction. In another embodiment, the first direction forms an angle of 45 degrees with the third direction, and the second direction forms the angle of 45 degrees with the fourth direction.

The galvano assembly can be affixed to the platform in order to fix the direction of motion. Alternatively, the galvano assembly can be arranged on the platform rotationally, such that the mutual orientations of the first, the second, the third, and the fourth directions can be fixed before, or during the operation of the laser cutting machine.

The laser cutting machine 200 can include a laser 150 for directing a cutting laser beam 160 to the first 141 and the second 146 mirrors of the galvano assembly via an optical fiber 170 and a collimator 175. In an alternative embodiment, the laser beam is directed to the galvano assembly via diagonal mirrors moving along the Y-gantry and X-axis platform. However, other variations are also possible.

The collimated cutting laser beam 160 is directed by the mirrors through a focusing module 180 for focusing the laser beam on the workpiece, producing a combined X-axis and Y-axis galvano assembly scan area 165 on the workpiece 100, and cutting the workpiece 100. An example of the focusing module 180 is a field-flattening F-theta lens or a non-telecentric F-theta lens. A size of the workpiece 100 can be greater than the galvano scan area 165 due to the motion of the platform.

In some embodiments, the control module includes a computer numerical control (CNC) controller 195. The control module controls the motion system and the galvano assembly according to precomputed G-code 190 that defines a trajectory of positions of the laser beam. For example, the G-code 190 encodes positions for the X-axis platform 130 as motion on the G-code axis X, the Y-axis gantry 120 as motion on G-code axis Y, X-motion galvano assembly 145 and mirror 146 as motion on G-code axis A, and Y-motion galvano assembly 140 and mirror 141 as motion on G-code axis B. This four-axis G-code is interpreted by the controller in during the operation of the laser cutting machine.

The interpretation of the C-code for the laser cutting machine has similarities with interpretation of the G-code for a milling machine with an extraordinarily fast trunnion table tilting in the A and B axes and having no motion in Z direction, other than "home to zero."

For example, the G-code actions such as an action G01, "interpolated linear motion," an action G02, i.e., "clockwise circular interpolation," and an action G03, i.e., "counter-clockwise circular interpolation," can be directly performed by the laser cutter. Other G-code actions are mapped to the operations on the laser cutter. For example, an action M03, i.e. "set cutting spindle speed," can set a power of the laser, and an action M06, i.e., "tool change." is used to change lenses.

In the embodiment shown in FIG. 2, the galvano assembly is arranged on the platform such that the first direction coincides with the third direction, and the second direction coincides with the fourth direction.

Figure 3:
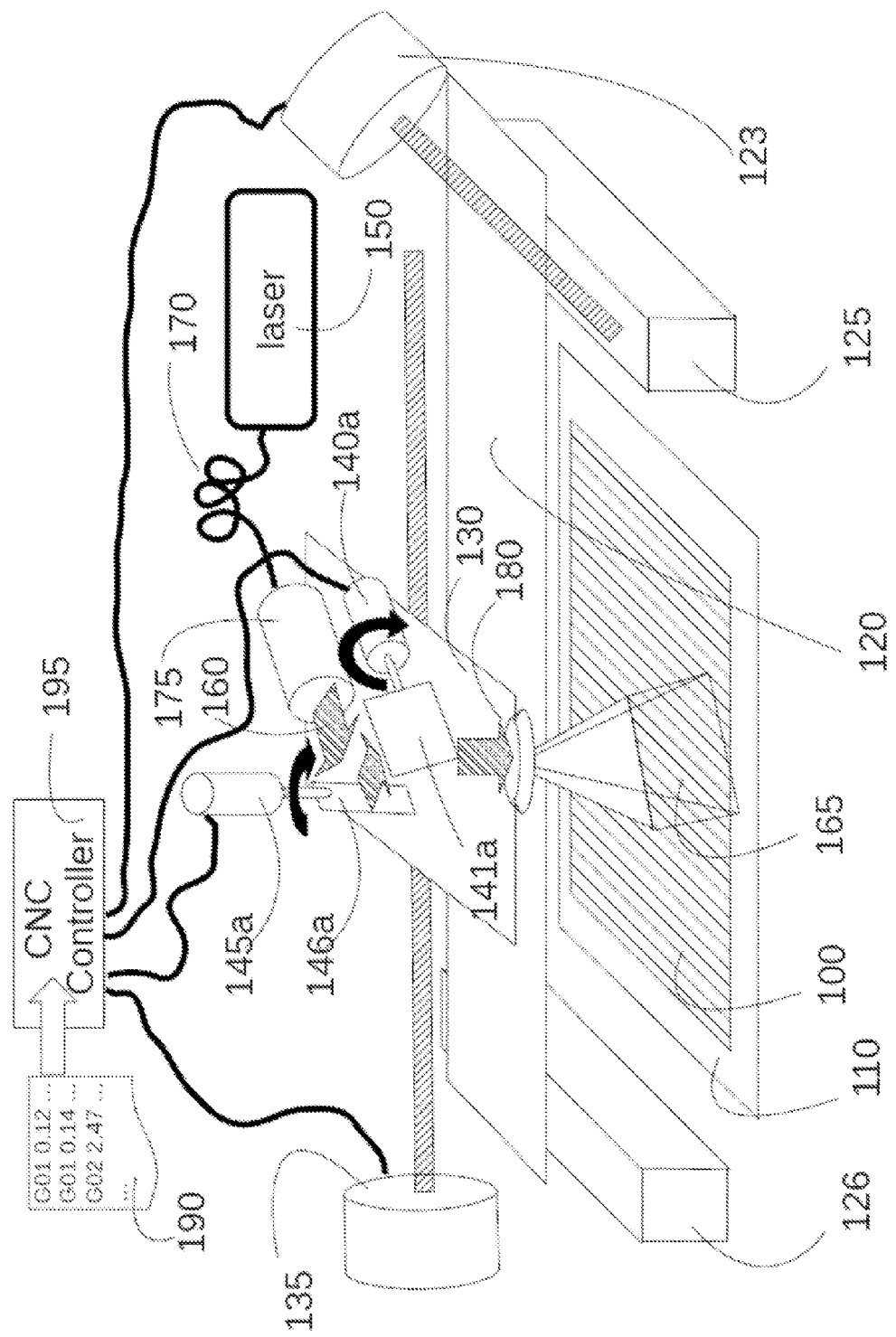
FIG. 3 is an isometric view of a laser cutting machine according to another embodiment of the invention.

FIG. 3 shows alternative embodiment, wherein the first direction forms an angle with the third direction, and the second direction forms an angle with the fourth direction.

For example, the galvano assembly and mirror drives referred, respectively, as 140, 141, 145, and 146 in FIG. 2, are rotated, in the embodiment of FIG. 3, with 45 degrees on a vertical axis and referred to as 140a, 141a, 145a, and 146a, respectively. For example, the first driver 140a and the first mirror 141a positioned such that the angle between the motion produced by the platform 130 along the first direction and the motion produced by the galvano assembly along the third direction, i.e., using the first driver 140a and the first mirror 141a, is approximately 45 degrees. Similarly, the second driver 145a and the second mirror 146a positioned such that the angle between the motion produced by the platform 130 along the second direction and the motion produced by the galvano assembly along the fourth direction, i.e., using the second driver 145a and the second mirror 146a, is approximately 45 degrees.

This embodiment is based on a realization that there is a preference of either vertical or horizontal (or nearly vertical or horizontal) lines of a cutting pattern. Because smaller details are cut at a high speed by the low-inertia galvano assembly, the maximum cutting speed for small details is proportional to the maximum acceleration that drivers of the galvano assembly can achieve without damage.

Figure 4:
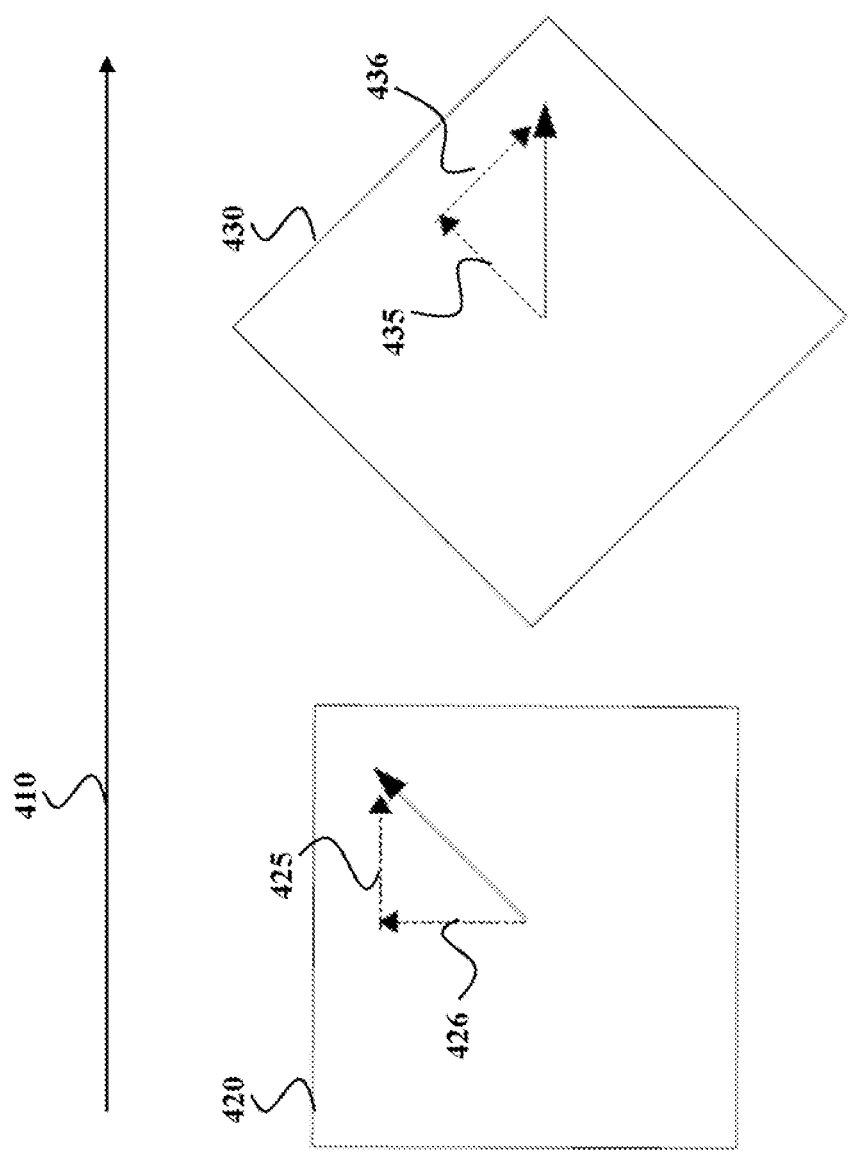
FIG. 4 is a schematic of a vector sum of the motions of positioning a laser beam according to some embodiments of the invention.

FIG. 4 shows the rationale for arranging the galvano assembly on the platform such that the motions of the galvano assembly are fixed with respect to the motions of the platform. For example, the platform has a motion along a direction 410, which is a common direction of a cutting pattern. Typically, the direction 410 is a vertical or horizontal direction in the coordinate system of the workpiece.

The galvano assembly is arranged on the platform such that the accelerations of the drivers of the galvano assembly results in the motion of the laser beam in addition to the motion of the platform. For example, the galvano assembly 420 is arranged such that acceleration of only one driver along the direction 425 contributes to the common motion of the laser beam along the direction 410. This is because the acceleration of another driver results in the motion of the laser beam along a direction 426 perpendicular to the direction 410.

In another example, the galvano assembly 430 is rotated 45 degrees on a vertical axis, such that the acceleration of drivers of the galvano assembly results in the motions along the direction 435 and 436 and can concurrently contribute to the motion of the laser beam along the direction 410. Because the acceleration of the laser beam is proportional to a Pythagorean sum of the two orthogonal galvano assembly, the horizontal and vertical cuts of the galvano assembly 430 can be performed approximately 1.41 times ($\sqrt{2}$) faster then cuts of the galvano assembly 420. Conversely, the more seldom-used diagonal cutting motions are now performed solely with a single galvano assembly motion, and are slower.

Figure 5:
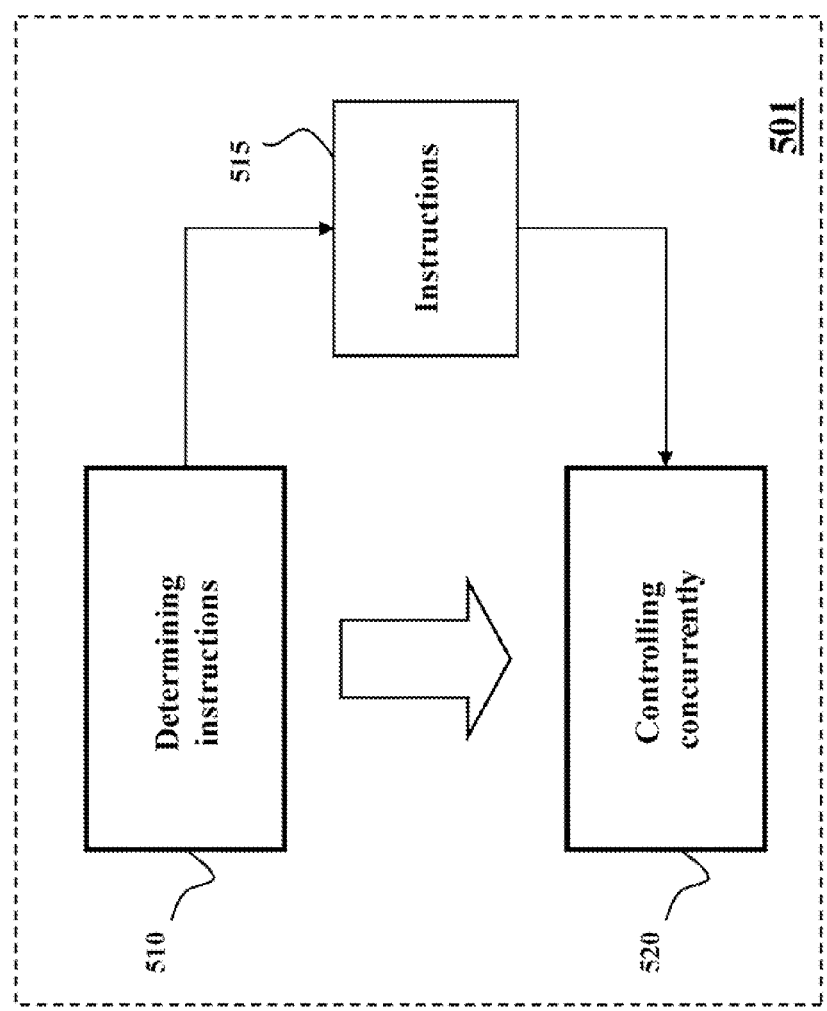
FIG. 5 is a block diagram of a method for controlling the operation of the laser-cutting machine according to some embodiments of the invention.

FIG. 5 shows a block diagram of a method 500 for controlling the operation of the laser-cutting machine. The laser cutting machine includes a galvano assembly arranged on the platform, such that a motion of the platform along a first direction and along a second direction causes a motion of the galvano assembly along the first and the second directions, wherein a motion of the galvano assembly directs a laser beam along a third direction, and along a fourth direction, and wherein mutual orientation of the first direction, the second direction, the third direction and the fourth direction is permanently fixed during the operation of the machine.

Typically before beginning of the operation, instructions 515 for controlling the motion of the platform and the motion of the galvano assembly are determined 510. The instruction defines a cutting path of the laser beam, such that a position of the laser beam on the cutting path is a vector sum of the motions along the first direction, the second direction, the third direction and the fourth direction.

During the operation, the motion system and the motion of the galvano assembly are controlled concurrently 520 according to the instructions. In one embodiment, the instructions include G-code. The method 500 can be implemented using a processor 501. For example, the processor may be implemented as integrated circuits, with one or more processors in an integrated circuit component. Though, a processor may be implemented using circuitry in any suitable format.

Various embodiments of the system provide a system and a method that optimizes controlling the machine with redundant actuators according to a reference trajectory of, e.g., a cutting pattern.

Inputs and Outputs

Figure 6:
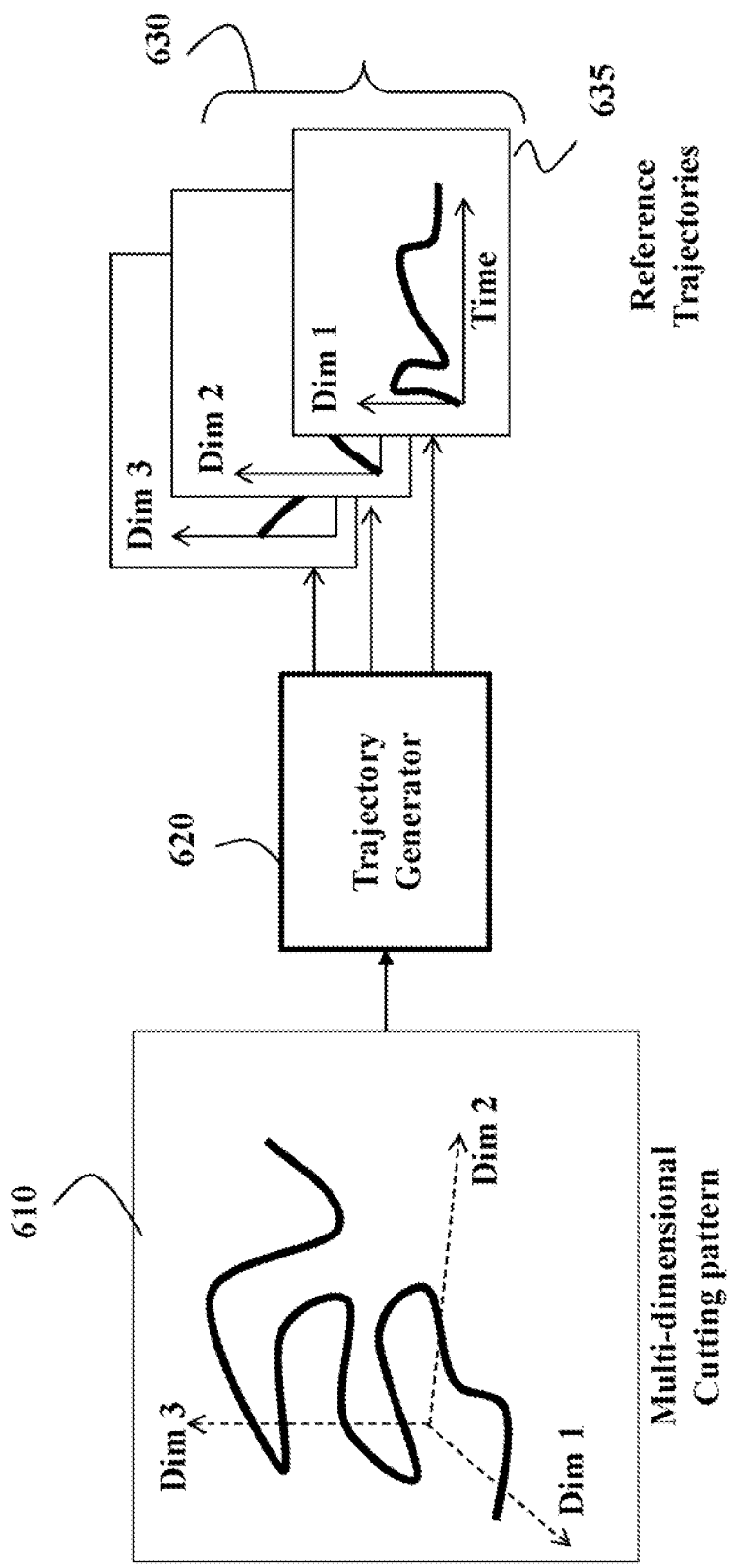
FIG. 6 is a schematic of generating time-varying trajectories from a reference trajectory of the cutting pattern according to one embodiment of the invention.

FIG. 6 shows an example of generating time-varying trajectories from a reference trajectory of the cutting pattern according to one embodiment of the invention. For example, the machine is a laser cutting machine that needs to cut a workpiece according to a multi-dimensional cutting, pattern 610 of n dimensions. One embodiment includes a trajectory generator 620 to produce the time profiles 630 of commands corresponding to each of those n dimensions. The time profiles 630 represent the reference trajectory. For example, if the cutting pattern is two-dimensional along X and Y directions, a time profile 635 can be an example of the trajectory of one actuator along an X direction.

Problem Overview

Figure 7:
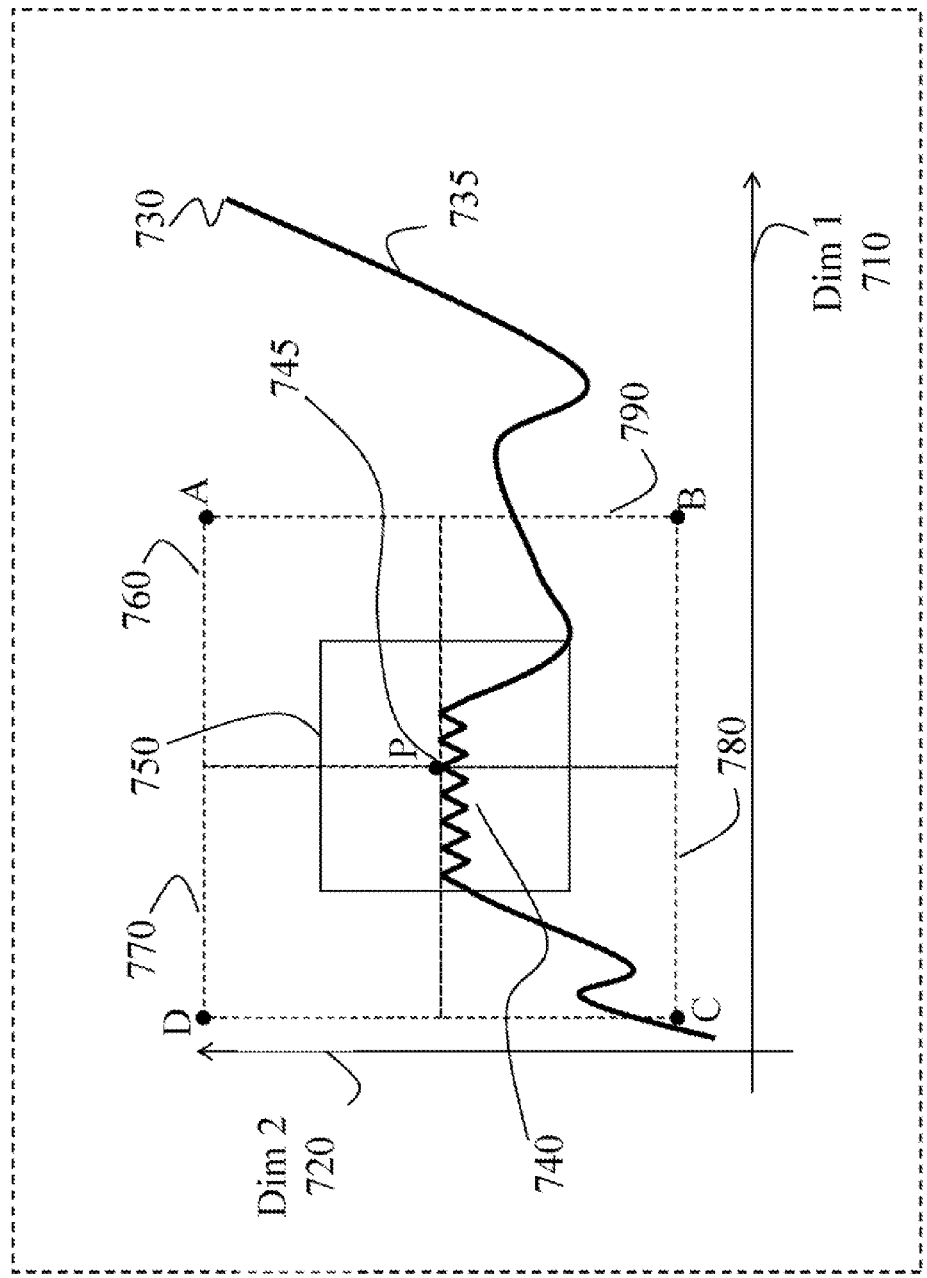
FIG. 7 is an illustration of a problem solved by various embodiments of the invention.

FIG. 7 illustrates the problem solved by various embodiments of the invention. In particular, a cutting path represented by the reference trajectory 700 is shown in two dimensions, i.e., n=2. The cutting path has low frequency components at flat portions 735 of the path, and high frequency components at portions 740 having sharp turn. At an arbitrary time instance, a laser beam 745 is located at a point P 745 on the cutting path.

The coordinated control problem solved by the embodiments of the invention is inherently difficult due to the redundancy of the actuators. For a redundant configuration involving two actuators, e.g., the first actuator such as a slow actuator and the second actuator such as a fast actuator, for each of the two directions, the laser beam 745 is located at the point P by a combination of displacement of the slow and last actuators. Importantly, this combination is unknown, and also not unique.

For example, if the slow actuator positions the center of the fast actuator at point P, then the range of motion of the fast actuator is indicated as the box 750. However, many other different locations of the slow actuator can position the center of the fast actuator within reach of the point P. For instance, the slow actuator can center the fast actuator in any of the squares 760, 770, 780, or 790. In the limiting case, the slow actuator can center the fast actuator at points A, B, C, or D, and the fast actuator can be actuated to maximum displacements to position the laser beam at the point P.

Determining the command sequences of the full machine as a function of time includes assigning times to each location of the cutting pattern in the n-dimensions. In assigning the time sequence, guarantees is provided for the coordination of control for locating the laser beam 745 at P. The coordination requires that the command sequences for every such point P on the cutting pattern are such that in moving the actuators from one point to the other, the objectives of various embodiments of the invention are met. Example objectives in reduction in electrical energy consumed and machine vibrations, and/or achieving a minimum-time for tracking the pattern.

Problem Difficulties

The presence of constraints makes a minimum-time optimal control generating optimal trajectories difficult to solve. This can be illustrated with following example of a two-dimensional laser cutting machine provided with a set of slow axes along each direction ($x_1$ and $x_2$), and a corresponding set of fast axes.

We define the vector of the state X $$x(t)=[x_{1s}(t)\dot{x}_{1s}(t)x_{1f}(t)\dot{x}_{1f}(t)x_{2s}(t)\dot{x}_{2s}(t)x_{2f}(t)\dot{x}_{2f}(t)]^T,$$

where the elements of the vector are, respectively, the position of the slow axis in $x_1$ direction, the velocity of the slow axis in $x_1$ direction, the position of the fast axis in $x_1$ direction, the velocity of the fast axis in $x_1$ direction, the position of the slow axis in $x_2$ direction, the velocity of the slow axis in $x_2$ direction, the position of the fast axis in $x_2$ direction, and the velocity of the fast axis in $x_2$ direction, and T is a transpose operator.

We also define the control u by the vector:

$$u(t)=[u_{1s}(t)u_{1f}(t)u_{2s}(t)u_{2f}(t)]^T.$$

The dynamics of the laser cutter in terms of the state and control defined above can be modeled, for simplicity, as a linear system $$\dot{x}=Ax+Bu.$$

In moving the actuators, many inequality and equality constraints have to be satisfied at each time instance. In one illustrative case, the state constraint inequalities that need to be satisfied are as follows:

The slow axes position constraints are $$x_{1s}(t)-x_{1s\,max} \leq 0,$$

$$-x_{1s}(t)-x_{1s\,max} \leq 0,$$

$$x_{2s}(t)-x_{2s\,max} \leq 0, \text{ and}$$

$$-x_{2s}(t)-x_{2s\,max} \leq 0.$$

The fast axes position constraints are $$x_{1f}(t)-x_{1f\,max} \leq 0,$$

$$-x_{1f}(t)-x_{1f\,max} \leq 0,$$

$$x_{2f}(t)-x_{2f\,max} \leq 0, \text{ and}$$

$$-x_{2f}(t)-x_{2f\,max} \leq 0.$$

Slow Axes Velocity Constraints:

$$\dot{x}_{1s}(t)-v_{1s\,max} \leq 0,$$

$$-\dot{x}_{1s}(t)-v_{1s\,max} \leq 0,$$

$$\dot{x}_{2s}(t)-v_{2s\,max} \leq 0, \text{ and}$$

$$-\dot{x}_{2s}(t)-v_{2s\,max} \leq 0.$$

Fast Axes Velocity Constraints:

$$\dot{x}_{1f}(t)-v_{1f\,max} \leq 0,$$

$$-\dot{x}_{1f}(t)-v_{1f\,max} \leq 0,$$

$$\dot{x}_{2f}(t)-v_{2s\,max} \leq 0, \text{ and}$$

$$-\dot{x}_{2f}(t)-v_{2s\,max} \leq 0.$$

Slow Axes Torque Constraints:

$$u_{1s}(t)-u_{1s\,max} \leq 0,$$

$$-u_{1s}(t)-u_{1s\,max} \leq 0,$$

$$u_{2s}(t)-u_{2s\,max} \leq 0, \text{ and}$$

$$-u_{2s}(t)-u_{2s\,max} \leq 0.$$

Fast Axes Torque Constraints:

$$u_{1f}(t)-u_{1fmax} \leq 0,$$

$$-u_{1f}(t)-u_{1fmax} \leq 0,$$

$$u_{2s}(t)-u_{2fmax} \leq 0, \text{ and}$$

$$-u_{2f}(t)-u_{2fmax} \leq 0.$$

Path Speed Constraint:

$$\dot{x}_s^2(t)+\dot{x}_f^2(t)-v_{max}^2 \leq 0.$$

This inequality is a quadratic constraint and represents the limit imposed on speed of the laser spot. The speed $v_{max}$ is a process parameter that is governed by the inherent time constants of the material removal during the laser processing operation. In contrast with other constraints imposed by the parameters of the machine, the path speed constraint is explicitly imposed by the laser processing.

The state constraint equalities that need to be satisfied according some embodiments are)

$$x_{1s}(t)+x_{1f}(t)-x_1(t)=0, \text{ and}$$

$$x_{2s}(t)+x_{2f}(t)-x_2(t)=0,$$

which represent the kinematic constraint that the position of the laser spot is a sum of position contributions resulting from the slow and fast axes for each direction.

For some embodiments, under the above constraints, an optimal control problem that minimizes the cutting time and/or the energy of the actuators cannot be solved numerically. In solving a constrained optimal control problem formulated for the command trajectory generation problem for a machine with redundant actuators, indirect approaches, such as those based on the minimum principle and associated necessary conditions, are also impractical to implement. This is because the form or structure of the control needs to be known apriori, and the problem is compounded by the presence of the numerous constraints detailed above.

Furthermore, the quadratic constraints limiting the speed of the laser spot along the trajectory result in, multi-point boundary value problem with nonlinear dynamics in the state and co-state variables. Such multi point boundary value problems do not have closed form solutions, and are numerically hard to solve, and are sensitive to initial estimates, the presence of singular arcs, and path constraints. Direct approaches such as those based on collocation or shooting methods are also limited, mainly because of low accuracy of the solutions. Furthermore, because such approaches result in nonconvex optimization problems, no guarantees can be provided for convergence to a globally optimal solution.

It follows from the preceding description, that a better approach is needed to determining the reference trajectories for the first and the second redundant actuators. In one embodiment of the invention, for machines with redundant actuators and constraints imposed by actuators and parameters of the laser operation, simple and physics-based, i.e. model-based knowledge is exploited to make the underlying optimization solvable. Furthermore, the embodiments have guarantees on feasibility or optimality, which in turn, ensure that the reference trajectory can be determined.

Solution Overview

Figure 8A:
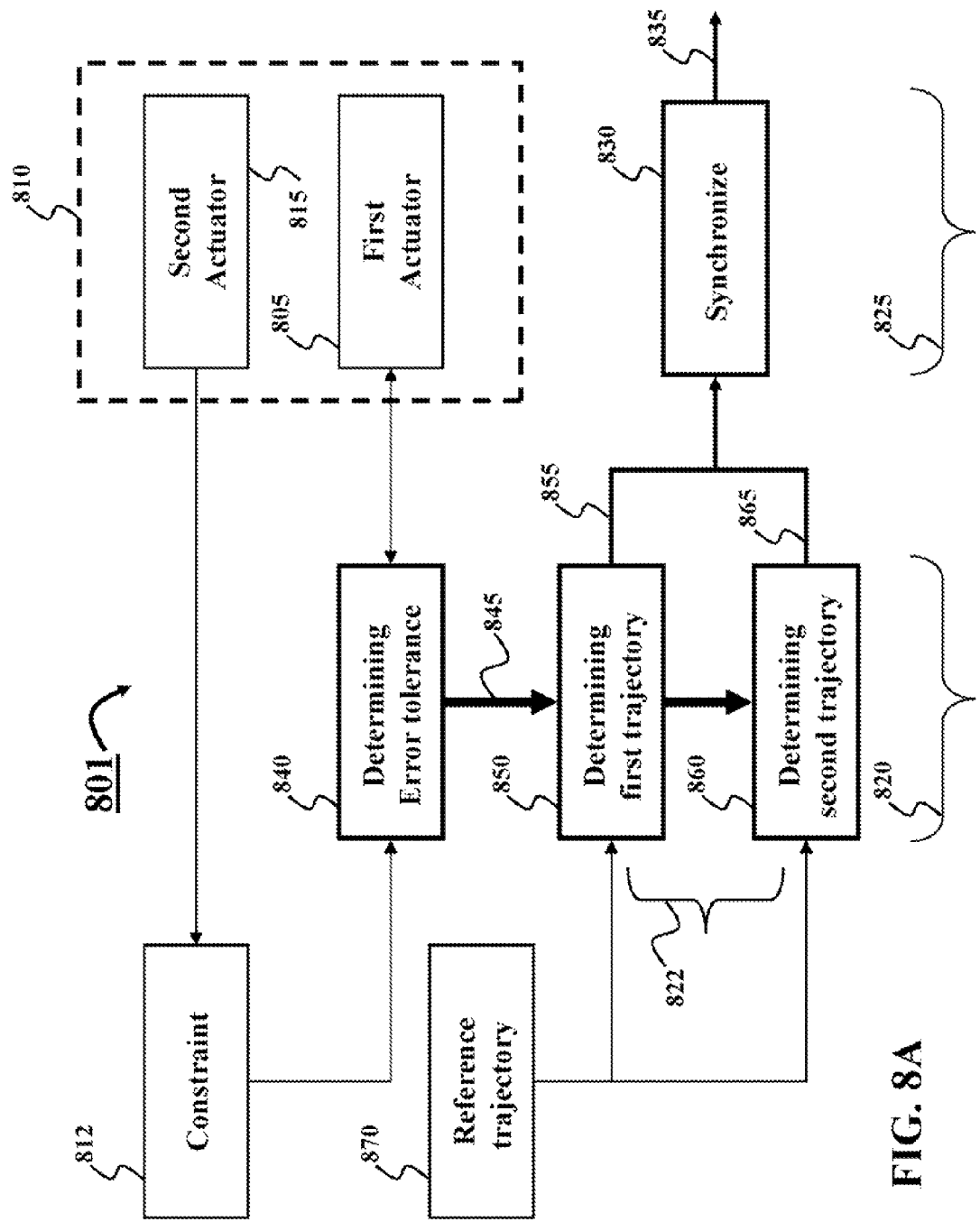
FIG. 8A is a diagram of a method for determining trajectories of redundant actuators of a machine pattern according to some embodiments of the invention.

FIG. 8A shows a method for determining trajectories of redundant actuators of a machine 810 including a first actuator 805 and a second actuator 815. The method can be performed by a processor 801, and can be implemented by, e.g., the trajectory generator 620.

Some embodiments of the invention are based on realization that the problem of determining trajectories for machine with redundant actuators can be simplified as an optimization problem that first accounts only for spatial position constraints 820 of the redundant actuators, irrespective of time response. In a subsequent step, a time solution is assigned to synchronize 830 motions of the individual actuators along their respective trajectories.

Such realization leads to dual decoupling of the parameters of optimization of the initial problem. First, embodiments decouple spatial constraints 820 from time constraints 825. Next, some embodiments decouple 822 spatial constraints of redundant actuators. The second decoupling is based on a realization that a first trajectory 855 of a first actuator 805 can be determined 850 based on tracking a reference trajectory 870 with an error tolerance 845 determined 840 as a function of at least one constraint 812 of the second actuator 815.

For example, the first trajectory is determined such that a curvature and a length of the first trajectory is minimized without violating an operational constraint of a second actuator, wherein the operational constraint is violated if a shortest distance between a point on the first trajectory and the reference trajectory is greater than an operational range of the second actuator. Thus, the determination of the first trajectory can be greatly simplified and optimized using various techniques of the optimization.

For example, one embodiment determines a cost function representing an operation of the first actuator tracking the reference trajectory and optimizes, according to the metric of performance, the cost function subject to a constraint imposed by the error tolerance determined as a function of constraint of the second actuator. In one implementation of this embodiment, the cost function is determined to be quadratic. Solution of such quadratic cost function allows achieving global optimal solution to the trajectories of actuators over the entire reference trajectory.

Figure 8B:
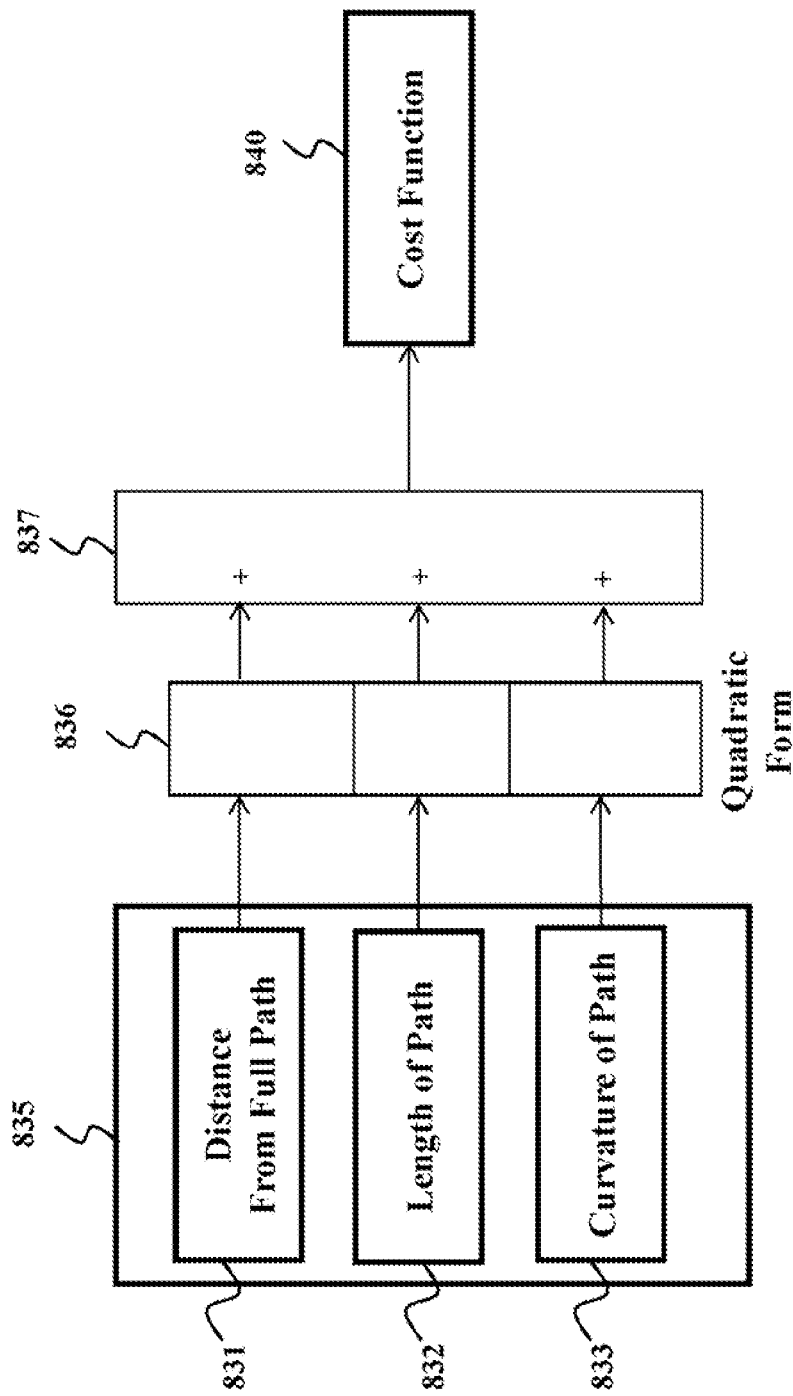
FIG. 8B is a schematic of a method for determining of a quadratic cost function according to some embodiments of the invention.

FIG. 8B schematically shows a method for determining of a quadratic cost function. The method can include identifying the key physical aspects 835 of the path traversed, by the actuators such as distance 831 of the slow axes path from the full path, length 832 of the paths, and curvature terms 833. The method can also include constructing quadratic forms 836 of the cost function and summing 837 the quadratic forms to derive the cost function 840. An optimization problem using a quadratic cost function along with linear constraints for a system with linear dynamics results in a convex optimization problem, which can be advantageous for a number of applications. Posing the cost function as a quadratic function thus allows for achieving global optimal solution to the trajectories of actuators over the entire reference trajectory.

Figure 8C:
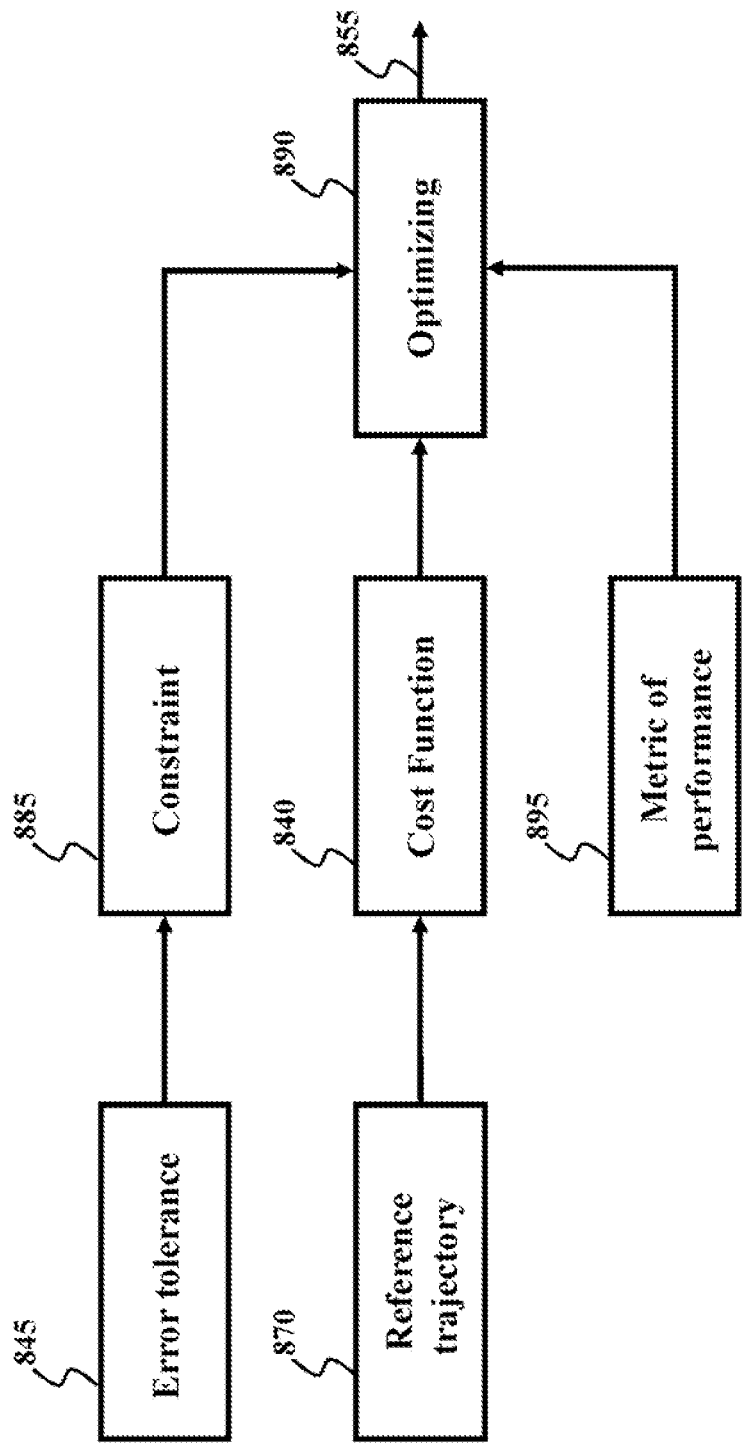
FIG. 8C is a diagram of a method for determining the trajectory using the cost function according to some embodiments of the invention.

FIG. 8C shows an example of determining the first trajectory using the cost function 840 representing an operation of the first actuator tracking the reference trajectory and optimizes 890 the cost function according to a metric of performance 895, e.g., time of the operation of the machine or energy consumption of the machine during the operation. The cost function is optimized subject to a constraint 885 imposed by the error tolerance 845 determined as a function of constraint 812 of the second actuator. The error tolerance can be determined from output measurements of the first actuator. If output measurements are not available, a model of the first actuator can be used to estimate the error tolerance. Furthermore, for example, due to the optimization, the first trajectory can be determined as smooth as the constraint 885 allows. The smooth path can require less energy consumption and time for tracking the reference trajectory. For example, due to the optimization, the first trajectory can determine a smooth path even considering the constraint 885. The smooth path can require less energy consumption and time for tracking the reference trajectory.

Referring to FIG. 8A, the second trajectory 865 can be determined 860 based on a difference between the first trajectory 855, and the reference trajectory 870. Next, a time sequence 835 synchronizing an operation of the first actuator according to the first trajectory with an operation of the second actuator according to the second trajectory is determined 830. For example, synchronization can be determined based on synchronization of the points of trajectories such that constrains of the redundant actuators are satisfied, as described below.

Examples of System and Method for Generating Trajectories

One embodiment of the invention solves the joint constrained optimal control problem in two steps. During the first step, the trajectories of the individual axes are selected such that a combination of changes in curvature and overall length of the path are minimized. The smooth path can require less energy consumption and time for tracking the reference trajectory. During the second step, time stamps are associated with motion of the individual axes along the respective trajectories, while ensuring the motions are synchronized.

FIG. 9A shows steps of a method 900 for determining the trajectories according to some embodiment. A multi-dimensional reference trajectory 910 is first sampled in a path sampling module 915 and the resulting points and/or corresponding coordinates are supplied to a constrained optimization module 920. The constrained optimization module determines a relatively smooth and short trajectory for the first actuator, e.g., the slower axes, while ensuring that the position constraints of all actuators, e.g., constraints of the second actuator, are satisfied. After the trajectories for redundant actuators are determined, the trajectories are supplied to a time assignment module 925 for assigning the time stamps. The time stamps ensure that a minimal time is allotted for synchronizing motions along the trajectories such that velocity and torque of acceleration constraints of the redundant actuators are satisfied. Because the time stamps are not necessarily at uniform intervals, in one implementation a module 930 of uniform time resampling is executed to determine the time trajectories 935, i.e. the position of the actuators along each dimension as a function of the time.

Figure 9B:
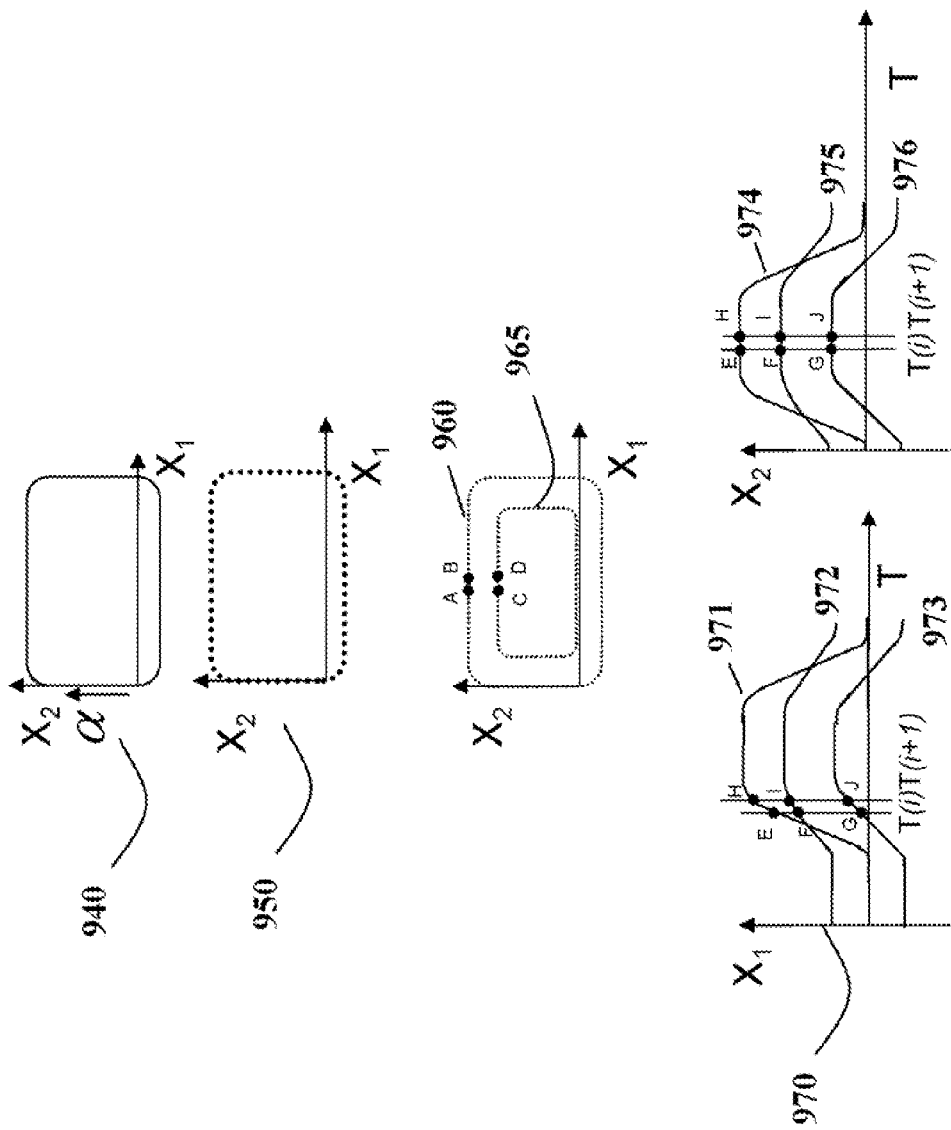
FIG. 9B is an illustration of some steps of method of FIG. 9A.

FIG. 9B shows an example of executing of steps of the method 900 to determine the trajectories of redundant actuators to jointly follow the cutting path 940. The cutting path 940 represented by the corresponding reference trajectory is substantially square with rounded corners. The FIG. 9B shows the path as an image $(x_1(\alpha), x_2(\alpha))$ of the continuous path distance parameter $\alpha$. A sampled i.e. space-discretized version of a set of points 950, which are denoted as $(x_1(i), x_2(i))$, where i is the sample index, ranging from 1 to the total number of samples, say, N. The constrained optimization module produces the discretized path 965, with samples denoted as $(x_{1s}(i), x_{2s}(i))$, where i ranges from 1 to N. While the combined motions of the actuators traverses the full path 960, the slow axes actuator traverses the path 965.

To illustrate the time assignment for the coordinated motion of the actuators along the paths 960 and 965, consider two points A and B on the full path 960, and corresponding points C and D in the slow axes path. Time stamps assigned to the sum of all actuator positions on path 960 at point A and slow actuator position on path 965 at point C are the same. Let us denote this time as T(i). Similarly, time stamps assigned to the sum of all actuator positions on path 960 at point B and slow actuator position on path 965 at point D are the same. Let us denote this time as T(i+1). The path coordinates of the actuators at the time instants T(i) and T(i+1) are as follows: $x_{1s}(i)$ and $x_{1f}(i)$ are the coordinates of the slow and fast actuators in the $X_1$ direction, and satisfy the kinematic constraint:

$$x_{1s}(i)+x_{1f}(i)=x_1(i)$$

i.e. the motions sum up to result in traversal of the full path 960.

The coordinates of the slow and fast actuators in the $X_2$ direction are $x_{2s}(i)$ and $x_{2f}(i)$, and satisfy the kinematic constraint: $x_{2s}(i)+x_{2f}(i)=x_2(i)$, i.e., the motions sum up to result traversal of the full path 960.

The time profiles of the path coordinates are shown in FIG. 9B as 971-976. For motion 970 along the $X_1$ direction, the path coordinate of the full reference $x_1$ is denoted as 971, that of the slow actuator $x_{1s}$ is denoted as 972, and that of the fast actuator $x_{1f}$ is denoted as 973. For motion along the $X_2$ direction, the path coordinate of the full reference $x_2$ is denoted as 974, that of the slow actuator $x_{2s}$ is denoted as 975, and that of the fast actuator $x_{2f}$ is denoted as 976.

The problem of time assignment at any time instant is one of determining the fastest time interval T(i+1)−T(i) that can be used to execute the displacement of the slow actuators from the position coordinates C $(x_{1s}(i), x_{2s}(i))$ to the position coordinates D($x_{1s}(i+1), x_{2s}(i+1)$), and the fast axes from the position coordinates $(x_{1f}(i), x_{2f}(i))$ to the position coordinates $x_{1f}(i+1), x_{2f}(i+1)$), so that the resultant hill axes displacement is from the position coordinates A $(x_1(i), x_2(i))$ to the position coordinates B $(x_1(i+1), x_2(i+1))$. This change in position coordinates should occur without violating the velocity, acceleration, and torque or force constraints of the actuators. For example, if the time interval T(i+1)−T(i) is too small, then velocity, acceleration, and torque or force constraints may not be satisfied. For very long time intervals, all constraints may be satisfied. But accumulating such long time intervals would result in large tact times, which are not desirable.

Furthermore, because the successive time intervals T(i)−T(i−1) may not be uniform over the range of values 1 to N that the sample index i can assume, the reference paths for each individual actuator ma be resampled at a uniform-time sampling rate to generate the final reference trajectories that execute the cutting pattern.

Trajectories for Individual Actuators

In some embodiments of the invention, in order to save on tact time and energy consumption, it is desired to have the slow actuators move smoothly and over shorter path lengths. But the slow axes needs to move such that position constraints of the fast axis are satisfied, i.e. at an point on the slow axes path, the corresponding point on the full reference should be within the reach of the fast axes.

An embodiment of the invention derives the reference paths for the individual actuators using a cost function, an example of which is as shown below for the case of a 2-dimensional laser cutting machine:

$$J(x_{1s}(i), x_{2s}(i)) = \sum_{i=1}^{N} q_1(x_1(i) - x_{1s}(i))^2 + q_2(x_2(i) - x_{2s}(i))^2 + \sum_{j=1}^{N-1} q_3(x_{1s}(i+1) - x_{1s}(i))^2 + q_4(x_{2s}(i+1) - x_{2s}(i))^2$$

The cost function J is expressed as a function of the vector of slow axes positions $(x_{1s}(i), x_{2s}(i))$, where i ranges from 1 to N. The first two terms of the cost function are penalized quadratic deviations of the slow axes paths from the full cutting pattern, while the last two are representative of the 2-norm of length of the slow axes paths. The scalars $q_1, q_2, q_3, q_4$ are tunable weights that alter the relative dominance of the terms appearing, in the cost function. For large values of $q_3$ relative to $q_4$, the length of the path along the $x_1$ axes is penalized more than that along $x_2$ axes. Similarly, for large values of $q_3$ and $q_4$ relative to $q_1$ and $q_2$, the lengths of the slow actuator paths are penalized more than the deviations from the full reference path.

In another embodiment of the invention, other terms can be added to the cost function, e.g. $2^{nd}$ (or even higher order) difference terms, to penalize curvature. For example, the following addition to the above cost function $$\sum_{j=1}^{N-1} \left\{ \begin{array}{l} q_5(x_{1s}(i-1)+x_{1s}(i-1)-2x_{1s}(i))^2 \\ +q_6(x_{2s}(i-1)+x_{2s}(i+1)-2x_{2s}(i))^2 \end{array} \right\}$$

denotes the $2^{nd}$ order difference terms. Adding such and more higher order difference terms allows for tuning the changes in the curvature of the slow axes path. Furthermore, tuning the scalar multiplier weights, the changes in the curvature of the path can be modulated relative to the path length of the slow axes reference.

One critical aspect to account for is the constraint that the slow axes cannot deviate from the full reference path by more than the range of the fast axes. This constraint can be formulated for each value of the index i as follows:

$-x_{1fmax} \leq x_1(i)-x_{1s}(i) \leq x_{1fmax}$ $-x_{2fmax} \leq x_2(i)-x_{2s}(i) \leq x_{2fmax}$ Using a linear transform on the slow axes coordinates $(x_{1s}(i), x_{2s}(i))$ for every index i, it can be shown that the above cost function and the constraints can be formulated into an optimization problem of the form shown below $U^* = \arg \min J(U)$ $J(U) = U^T Q U + H^T U$ $0 \leq U \leq U_{max}$ where the matrix Q is a symmetric positive definite banded diagonal matrix, with the number of bands increasing for increasing number of higher order difference terms used in the cost function to tune changes in the curvature.

Because posed optimization is a quadratic function in cost and linear box in constraints, the optimization is convex. This guarantees that the solution is globally optimum.

In an embodiment of the invention, the reference paths generated for the individual actuators are assigned time stamps to ensure a minimum-time solution that maintains the velocity and torque or acceleration constraints of all the actuators.

For example, starting from time $T(1)=0$, the time for successive samples can be assigned as $T(i)=T(i-1)+\Delta T(i) \forall i=2,3,4,\ldots,N$ where the time increments are defined as $\Delta T(i) = T(i) - T(i-1) > 0$ and determined from the relation:

$\Delta T(i) = \max(\Delta T_1(i), \Delta T_2(i))$ where $$\Delta T_1(i) = \int_0^{\Delta \alpha} \frac{d\alpha}{d\dot{\alpha}}$$

$$\Delta T_2(i) = \int_0^{\Delta \alpha_s} \frac{d\alpha_s}{d\dot{\alpha}_s}$$

for path distance variables $\alpha$ for the full reference path and $\alpha_s$ for the slow axes path, and the derivatives, the speed along the respective paths are chosen such that velocity and torque or acceleration all constraints are satisfied, and the speed of the laser spot along the full path is always less than the physical limit set by the laser processing operation.

In an embodiment of the invention, the references along with the time stamps generated above can be resampled at uniform time so that the resultant trajectories can be implemented in hardware. The resampling can be performed by a polynomial or spline interpolation of the path distance variables as a function of time for the individual actuators, and obtaining the corresponding positions of the actuators in each of the n-dimensions. In another embodiment, the interpolation can be performed to minimize jerk, acceleration or other motion metrics to ensure that a smooth trajectory is obtained.

Fast Solvers

Convex quadratic programming problems can be solved by fast quadratic programming solvers based on, e.g., interior point methods, and active-set methods.

Figure 10:
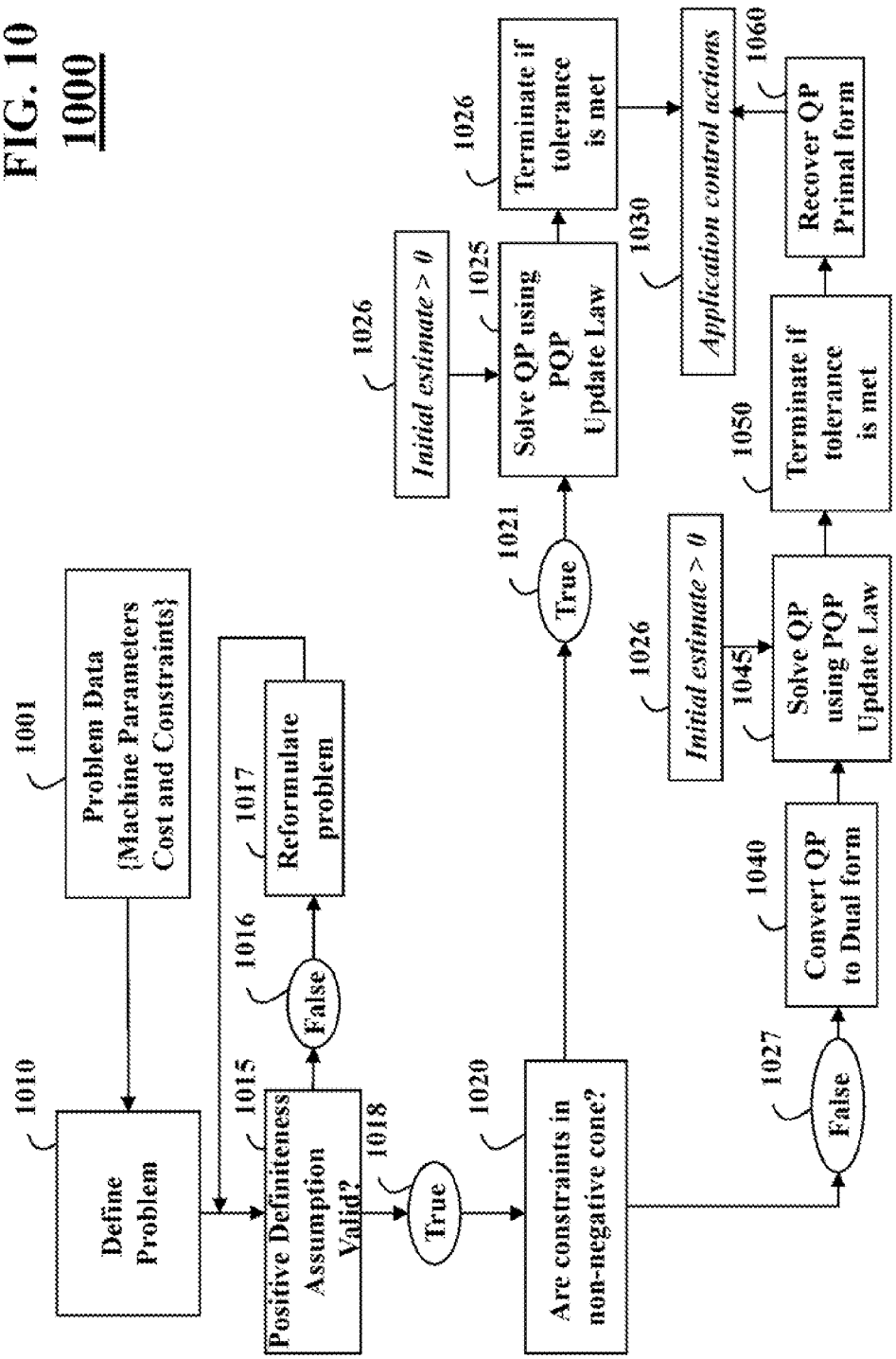
FIGS. 10-13 are block diagrams of various control architectures for controlling individual actuators according to various embodiments of the invention.

FIG. 10 shows a block diagram of a method for minimizing the cost function of the above optimization formulation. The problem is tested 1015 for validity of an assumption, on positive definiteness of the quadratic term used in the quadratic program. If the assumption is not valid 1016, then the QP is reformulated 1017 until the assumption is valid.

If the assumption is valid 1018, then there is an additional condition to be tested 1020 for the constraints of the problem. If the constraints are in a non-negative cone 1021, then the QP is solved 1025 by using a parallel quadratic programming (PQP) update law with a positive initial estimate 1026 until a termination condition 1026 is met. Many choices exist for the termination condition, for example, a tolerance on the cost function or on primal variables, or on changes in the values. The control actions obtained from the optimization are then applied 1030 to the application, e.g., machine, plant, and the like.

If the constrains are not in the non-negative cone 1027, then the primal QP is converted 1040 to a dual form, and the PQP update law is applied 1045 for a positive initial estimate until a termination condition is met 1050. The original primal problem is recovered 160 from the dual form and the corresponding control actions are applied to the application.

The method of FIG. 10 solves the quadratic programming problem by first converting the problem into dual according to:

$$\min_y \left\{ F(y) = \frac{1}{2} y^T Q y + y^T h \right\}_i \quad (24)$$

s.t. $y \geq 0$ where y is the dual variable vector, $Q>0$ is a fixed Hessian matrix that depends on the fixed constraints, the system parameters, and user-defined weights in the cost function, and T is the transpose operator. This dual form can be solved using a parallelizable iterative update law $$y_i \leftarrow y_i \left[ \frac{h_i^- + (Q^- y)_i}{h_i^+ + (Q^+ y)_i} \right] \quad (25)$$

This update can be iterated in parallel on a multiprocessor machine with each processor updating one or more variables $y_i$ independently.

Controlling the Operation of the Actuators

In various embodiments of the invention, the sequences of commands required for coordinating motions of the redundant actuators are determined by solving the minimization of cost function of Equation (1) subject to constraints of Equations (3)-(7) using, e.g., a quadratic programming problem formulation and fast quadratic programming solvers. There are many possible ways for applying the command sequences. After the minimization is performed and the control variables are solved, a model of the system can be used to generate command sequences for each of the individual actuators, or axes of motion.

Figure 11:
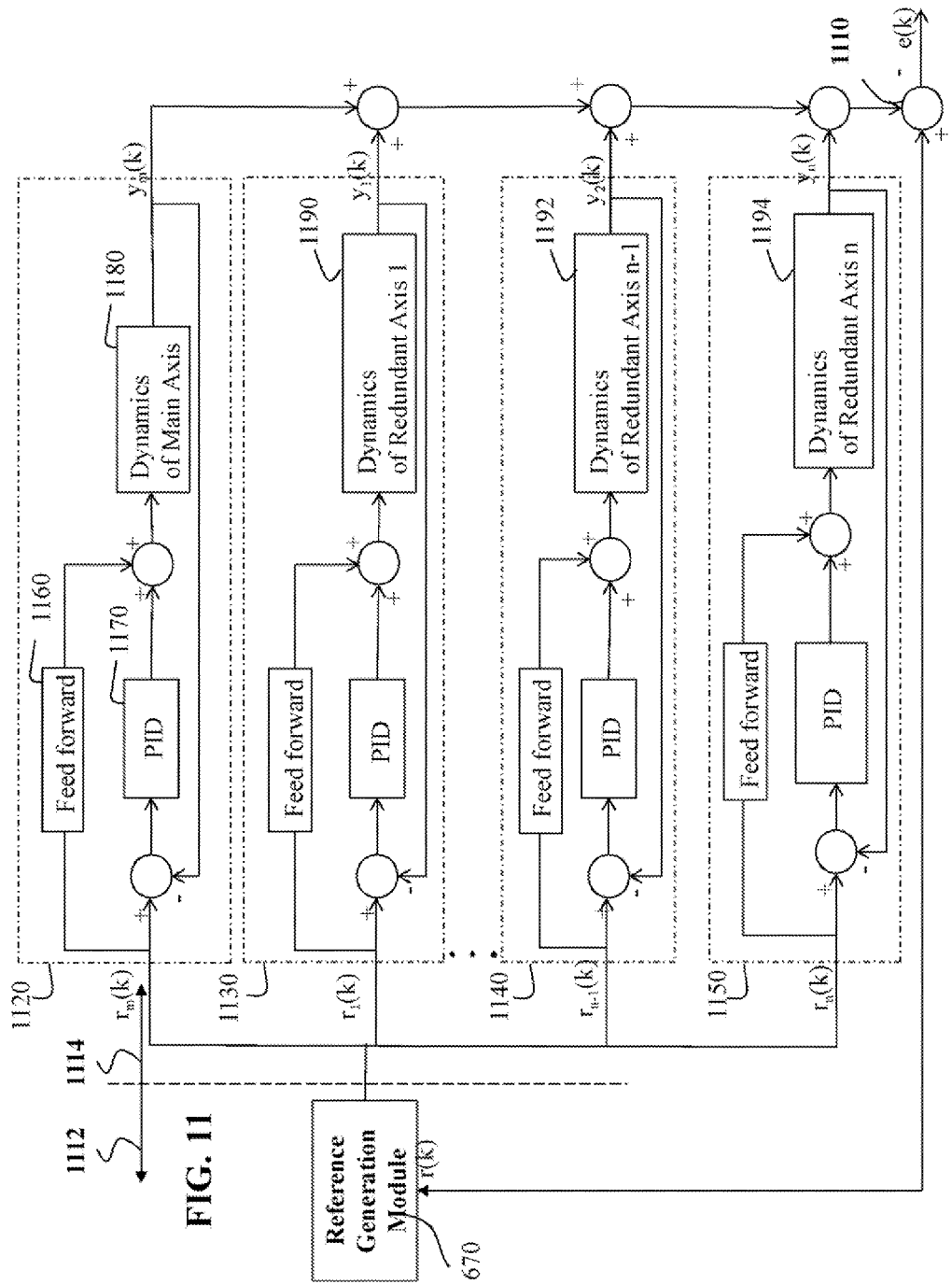

FIG. 11 shows an example of the controller controlling the redundant actuators based on command sequences obtained from the optimization module 670, e.g., the command sequences $r_m(k)$ for the main actuator 1180, the command sequences $r_1(k)$ for first redundant actuator 1190, the command sequences $r_2(k)$ for second redundant actuator, and so on until the command sequences $r_n(k)$ for the n-th redundant actuator 1194. While the sequences of commands can be generated offline 1112, the commands are followed using an online 1111 implementation through control modules. For example, a control module 1120 is used to control operation of the main actuator 1180, a control module 1130 is used to control operation of the actuator 1190, a control module 1140 is used to control operation of the actuator 1192, and a control module 1150 is used to control operation of the actuator 1194. Each control module, such as 1120, can include a feedback-based control block such as a proportional-integral-derivative controller (PID) 1170, and a feed-forward based control block 1160 that are input to the dynamics of the respective actuators.

Many rapid controller platforms are available to operate such controllers. These include both digital signal processing (DSP), and field-programmable gate array (FPGA) based implementations in which the controller parameters can be tuned for improving tracking performance. In one embodiment, the tracking error e(k) 1110 is the difference between the given reference trajectory and the sum of the outputs of the individual actuators indicated as $y_m(k)$ for the main actuator, and $y_1(k)$, $y_2(k)$ and so on until $y_n(k)$ for the redundant actuators.

The control modules 1120, 1130, 1140, and 1150 can be implemented using many feed-back based and/or feedforward based controllers. These include, and are not limited to, feedback controllers such classical lead, lag, lead-lag or proportional, proportional derivative, proportional integral, optimal controllers synthesized based on linear quadratic Guassian control, $H_2$ or $H_\infty$ loop shaping and optimization, feedforward controllers such as those based on pre-filtering and model-inversion, and two degree-of-freedom mixed sensitivity synthesis.

The control modules 1120, 1130, 1140, and 1150 are decoupled from each other. However, some embodiments also include feedforward blocks and control signals that allow for compensation of any interactions between the different actuators.

Figure 12:
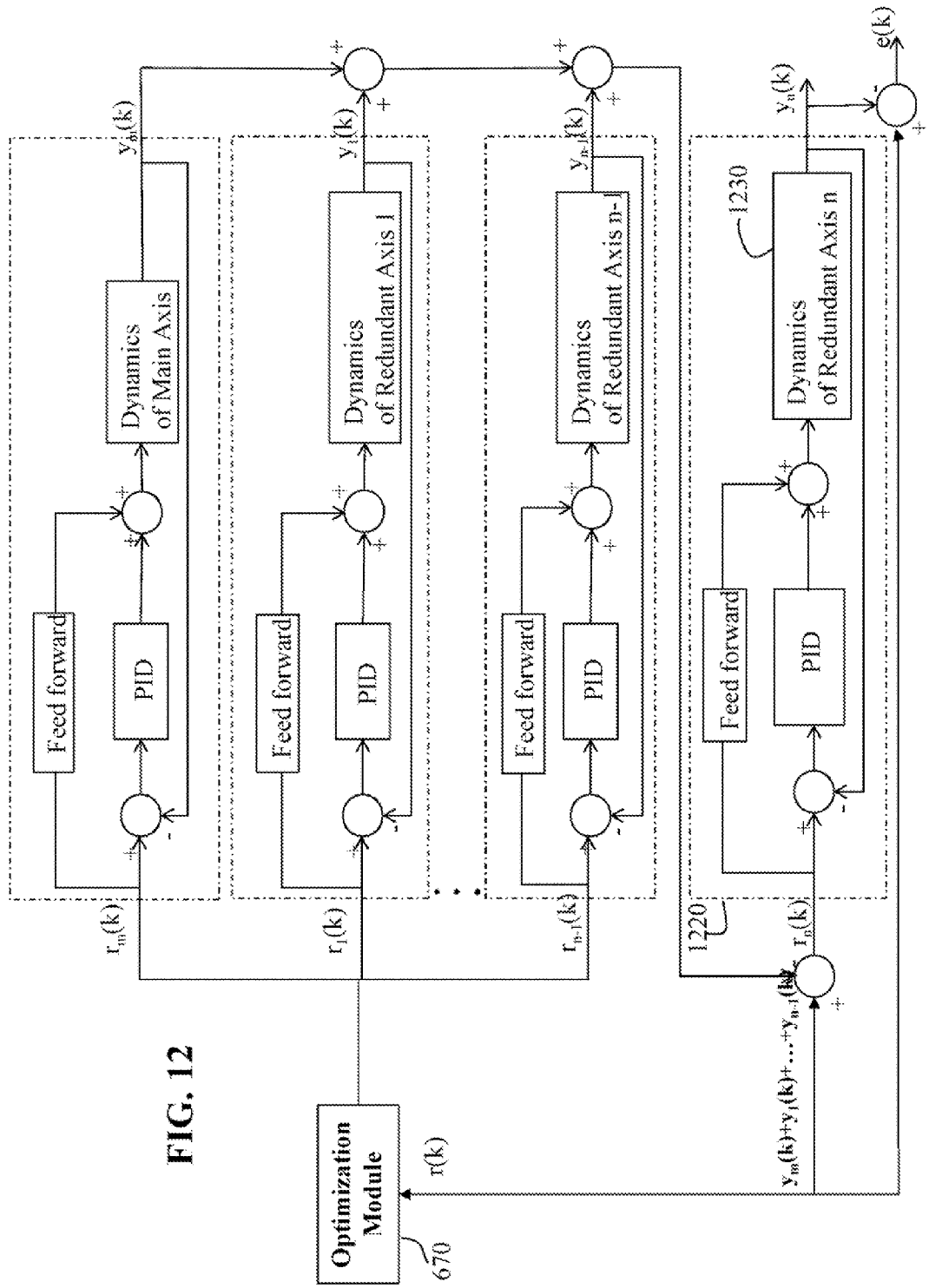

FIG. 12 shows another embodiment of the controller, in which the control module 1220 used for the last redundant actuator 1230 is driven with a command that may be different from the command sequence obtained from the optimization module 670. The command applied to control module 1220 is determined by calculating the difference between the current sample of the reference trajectory and the sum of the outputs of other redundant actuators.

Figure 13:
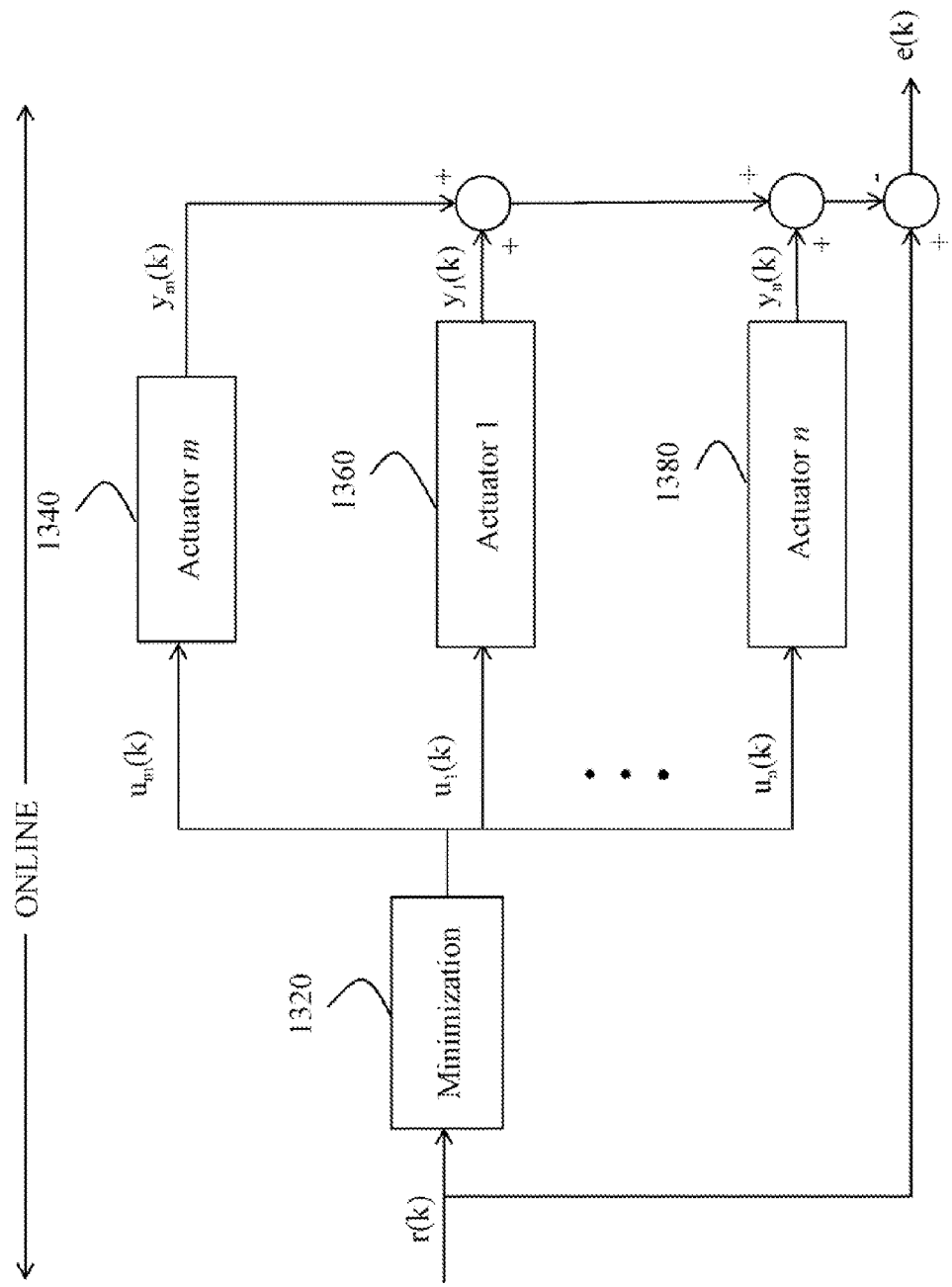

FIG. 13 shows yet another example of the controller wherein the minimization 1320 of the cost function is performed online using a fast quadratic programming solver such as the parallel quadratic programming solver discussed above. Other embodiments include explicit, mapping of the control as an affine function of state space and the reference trajectory. The command sequences include controls torques or forces that are directly applied to the corresponding axes of motion. The solver can be tuned online for the different weights in the cost function and the constraint, and the tracking performance measured in terms of the error e(k) can also be tuned online.

EFFECT OF THE INVENTION

Embodiments of the invention increase a productivity of a laser-cutting machine. Specifically, the combination of the galvano assembly arranged on a movable platform in a fixed position allows for cutting large parts of a workpiece with fine details, avoids mechanical crashes of the components of the laser cutting machine, simplifies the controlling of the machine, and reduce the time require to cut workpieces.

Some embodiments of the invention also result in coordinated control between the large range slow servo-motor-driven actuator and the short-range galvano actuator. Specifically, an optimal combination of commands is generated such that the electrical energy consumed and machine vibrations are minimized, while always satisfying the constraint imposed by the command pattern that the laser beam has to track without reaching position, velocity, and torque limits of individual actuators.

The embodiments of the invention enable offline and real-time implementations, thus making the embodiments suitable for a wide range of factory automation, energy, control, and robotics applications where multiple actuators are integrated in a system to achieve more benefits than possible when single actuators are used.

Some embodiments of the invention result in minimum-time solutions in generating references that can be tracked by the machine under the constraints, in achieving minimum-time solutions, it is guaranteed to account for the redundancy of the actuators. Because minimum-time solutions are used for moving the machine according to the desired pattern, the embodiments of the invention can help to assess bottlenecks in the production cycle, such as changing metal substrates, or adjusting the laser physical parameters, such as power and laser pulse duration.

Some embodiments of the invention can target achieving energy savings by increasing the time to cut obtained from the minimum time reference trajectory. Some embodiments of the invention allow the user to trade-off energy and time requirements along the reference trajectory.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for determining trajectories of redundant actuators of a machine, wherein the redundant actuators includes a first actuator and a second actuator, the method comprising:
determining a first trajectory of the first actuator tracking a reference trajectory with an error tolerance less than an operational range of the second actuator, wherein the error tolerance forms at least a part of an inequality constraint, and wherein the determining solves a constraint optimization problem of an operation of the first actuator subject to the inequality constraint, comprising:
determining a cost function representing the operation of the first actuator tracking the reference trajectory as a function of a length of the first trajectory, a curvature of the first trajectory and the error tolerance; and
optimizing the cost function by solving the constraint optimization problem subject to the inequality constraint and an equality constraint, wherein the inequality constraint includes a position constraint, a velocity constraint, an acceleration constraint, and a torque constraint of the second actuator, and wherein the equality constraint includes a kinematic constraint on a sum of position contributions resulting from operations of the first and the second actuators; and
determining a second trajectory of the second actuator based on a difference between the reference trajectory and the first trajectory, wherein steps of the method are performed by a processor.

2. The method of claim 1, further comprising:
controlling the redundant actuators, such that the second actuator tracks the reference trajectory based on a combination of motions according to the first and the second trajectories.

3. The method of claim 1, further comprising:
determining the cost function as a function of points;
optimizing the cost function subject to the inequality constraint to determine locations of the points forming the first trajectory, such that at least one of a length and a curvature of the first trajectory is optimized.

4. The method of claim 1, wherein the first cost function is a quadratic cost function, and the inequality constraint is a linear constraint.

5. The method of claim 1, further comprising:
representing the length as a sum of distances between adjacent points;
representing the error tolerance as a maximum distance between a point on the first trajectory and a corresponding point on the reference trajectory; and
representing the curvature as high-order spatial derivatives of the distances between adjacent points.

6. The method of claim 1, further comprising:
constructing a convex quadratic program with quadratic cost and linear constraints;
solving the convex quadratic program to achieve a global optimal solution to the trajectories of actuators over the reference trajectory.

7. The method of claim 6, wherein the solving uses a parallel quadratic programming with multiplicative updates.

8. The method of claim 1, further comprising:
determining a time sequence synchronizing an operation of the first actuator according to the first trajectory with an operation of the second actuator according to the second trajectory.

9. The method of claim 8, further comprising:
determining the time sequence such that a total time of the operation of the redundant actuators is minimized.

10. The method of claim 8, further comprising:
determining the time sequence such that a total time of the operation of the redundant actuators and energy consumptions of the redundant actuators are optimized.

11. A method for controlling concurrently a first actuator and a second actuator of a machine, comprising:
determining an inequality constraint on an operation of the first actuator as an error tolerance on tracking a reference trajectory, wherein the error tolerance is less than an operational ramie of the second actuator;
solving a constraint optimization problem subject to the inequality constraint for determining a first trajectory of the first actuator tracking the reference trajectory with the error tolerance, such that the first trajectory is optimized according to a metric of performance;
determining a second trajectory of the second actuator based on a difference between the first trajectory and the reference trajectory;
determining a time sequence synchronizing an operation of the first actuator according to the first trajectory with an operation of the second actuator according to the second trajectory; and
controlling concurrently the first actuator and the second actuator according to the first trajectory, the second trajectory, and the time sequence, wherein the determining the first trajectory comprises:
determining a cost function representing an operation of the first actuator tracking the reference trajectory; and
optimizing, according to the metric of performance, the cost function subject to the inequality constraint imposed by the error tolerance and an equality constraint, wherein the inequality constraint includes a position constraint, a velocity constraint, an acceleration constraint, and a torque constraint of the second actuator, and wherein the equality constraint includes a kinematic constraint on a sum of position contributions resulting from operations of the first and the second actuators.

12. A trajectory generator for determining trajectories of redundant actuators of a machine comprising a processor for executing a set of modules, the set of modules comprising:
a path sampling module for sampling a reference trajectory to produce a set of points;
a constrained optimization module for determining, based on the set of points, a first trajectory of a first actuator, such that the a curvature and a length of the first trajectory is minimized without violation of an operational constraint of a second actuator, and for determining a second trajectory of the second actuator based on the first and the reference trajectories, wherein the operational constraint is satisfied when a shortest distance between a point on the first trajectory and the reference trajectory is greater than an operational range of the second actuator, wherein the constrained optimization module determines a cost function representing an operation of the first actuator tracking the reference trajectory and solves a constraint optimization problem of operations of the first and the second actuators optimizing the cost function subject to an inequality constraint on the operation of the first actuator and an equality constraint on the operations of the first and the second actuators, wherein the inequality constraint includes a constraint on an operation ramie of the second actuator, and constraints on a position, a velocity, an acceleration, and a torque of the second actuator, and wherein the equality constraint includes a kinematic constraint on a sum of position contributions resulting from operations of the first and the second actuators; and a time assignment module for assigning time stamps for points on the first and the second trajectories, such that motions along the first and the second trajectories are synchronized without violation of operational constraints of the redundant actuators.

13. The trajectory generator of claim 12, further comprising:

a uniform time resampling module for resampling the first and the second trajectory to produce time trajectories for each dimension of the reference trajectory.

* * * * *